(12) United States Patent
Spanhove et al.

(10) Patent No.: US 8,921,301 B2
(45) Date of Patent: *Dec. 30, 2014

(54) COLORED SPECKLES FOR USE IN GRANULAR DETERGENTS

(71) Applicant: Milliken & Company, Spartanburg, SC (US)

(72) Inventors: Steven Spanhove, Ghent (BE); Gregory Eduard Fernandes, Greenville, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/909,230

(22) Filed: Jun. 4, 2013

(65) Prior Publication Data

US 2013/0267452 A1    Oct. 10, 2013

Related U.S. Application Data

(63) Continuation of application No. 13/040,373, filed on Mar. 4, 2011, now Pat. No. 8,470,760.

(51) Int. Cl.

| | |
|---|---|
| *C11D 17/06* | (2006.01) |
| *C11D 3/40* | (2006.01) |
| *C11D 3/10* | (2006.01) |
| *C11D 7/12* | (2006.01) |
| *C09B 67/42* | (2006.01) |
| *C09B 67/02* | (2006.01) |

(52) U.S. Cl.
CPC ............ *C11D 17/06* (2013.01); *C09B 67/0095* (2013.01); *C09B 67/0097* (2013.01); *C11D 3/40* (2013.01)
USPC ........... 510/438; 510/220; 510/276; 510/349; 510/509; 510/513

(58) Field of Classification Search
CPC ...... C11D 17/06; C11D 17/0034; C11D 3/10; C11D 3/40; C11D 3/42; C09B 67/0095; C09B 67/0097
USPC .................. 510/438, 220, 276, 349, 509, 513
See application file for complete search history.

(56) References Cited

U.S. PATENT DOCUMENTS

| | | | |
|---|---|---|---|
| 3,529,923 A | 9/1970 | Perry et al. ............................. 8/77 |
| 3,630,944 A | 12/1971 | Ohkawa et al. ............ 252/301.3 |
| 3,661,785 A | 5/1972 | De Pierri ..................... 252/8.56 |
| 3,931,037 A * | 1/1976 | Hall .............................. 510/534 |
| 3,989,635 A | 11/1976 | Toyoda et al. ................. 252/135 |
| 3,997,692 A | 12/1976 | Lamberti ....................... 427/215 |
| 4,097,418 A * | 6/1978 | Rolfes ............................ 510/534 |
| 4,193,888 A * | 3/1980 | McHugh ........................ 510/100 |
| 4,196,103 A * | 4/1980 | Richter .......................... 510/441 |
| 4,325,933 A | 4/1982 | Matsumoto et al. ........... 423/415 |
| 4,488,972 A | 12/1984 | Weinstein ....................... 252/8.6 |
| 4,721,633 A * | 1/1988 | Baldassin ...................... 427/212 |
| 5,462,804 A | 10/1995 | Kokubu et al. ............ 428/402.24 |
| 5,605,883 A | 2/1997 | Iliff et al. ........................ 510/444 |
| 6,107,269 A * | 8/2000 | Engels et al. .................. 510/444 |
| 6,221,430 B1 * | 4/2001 | Tompsett ....................... 427/212 |
| 6,440,926 B1 | 8/2002 | Spadoni et al. ................ 510/445 |
| 6,444,634 B1 | 9/2002 | Mason et al. .................. 510/376 |
| 6,541,437 B2 | 4/2003 | Mata et al. ..................... 510/348 |
| 6,712,862 B1 * | 3/2004 | Grimm et al. ..................... 8/524 |
| 8,318,652 B2 * | 11/2012 | Fernandes et al. ............ 510/349 |
| 8,470,760 B2 * | 6/2013 | Spanhove et al. .............. 510/438 |
| 8,476,216 B2 * | 7/2013 | Fernandes ..................... 510/349 |
| 2001/0041165 A1 * | 11/2001 | Katdare et al. ................... 424/44 |
| 2003/0003147 A1 * | 1/2003 | Katdare et al. ................. 424/466 |
| 2004/0137058 A1 * | 7/2004 | Katdare et al. ................. 424/466 |
| 2006/0019860 A1 * | 1/2006 | Cardozo et al. ................ 510/445 |
| 2006/0034921 A1 * | 2/2006 | Katdare et al. ................. 424/466 |
| 2006/0217288 A1 * | 9/2006 | Wahl et al. ..................... 510/515 |
| 2007/0087052 A1 * | 4/2007 | Katdare et al. ................. 424/466 |
| 2009/0255478 A1 * | 10/2009 | Wadams et al. ................ 119/173 |
| 2010/0069282 A1 | 3/2010 | Prabhat et al. ................. 510/276 |
| 2011/0053823 A1 * | 3/2011 | Fernandes et al. ............ 510/349 |
| 2011/0294713 A1 | 12/2011 | Fernandes ..................... 510/276 |

FOREIGN PATENT DOCUMENTS

| | | |
|---|---|---|
| DE | 195 42 830 | 5/1997 |
| DE | 100 48 875 | 4/2002 |
| EP | 2 166 078 | 3/2010 |
| GB | 801 018 | 9/1958 |
| WO | WO 99/64555 A1 * | 12/1999 |
| WO | WO 01/30952 | 5/2001 |
| WO | WO 2006/099964 | 9/2006 |
| WO | WO 2007/006357 | 1/2007 |
| WO | WO 2007/006357 A1 * | 1/2007 |
| WO | WO 2009/087033 | 7/2009 |
| WO | WO 2011/020991 | 2/2011 |

OTHER PUBLICATIONS

Patent Cooperation Treaty PCT International Search Report, Date of Mailing, Aug. 4, 2011. International Application No. PCT/US2011/037642. International Filing Date, May 24, 2011.

* cited by examiner

*Primary Examiner* — Lorna M Douyon
(74) *Attorney, Agent, or Firm* — Brenda D. Wentz

(57) ABSTRACT

This invention relates to non-bleeding, non-staining colored speckles for use in granular or powdered detergents such as laundry detergents and automatic dishwashing detergents. The colored speckles are comprised of a salt or salt-containing carrier and a coloring agent and are characterized as being substantially uniformly colored throughout the cross-sectional volume of the speckle.

2 Claims, No Drawings

COLORED SPECKLES FOR USE IN GRANULAR DETERGENTS

CROSS REFERENCE TO RELATED APPLICATIONS

This application is a continuation of U.S. patent application Ser. No. 13/040,373, entitled "Colored Speckles For Use In Granular Detergents" which was filed on Mar. 4, 2011, now U.S. Pat. No. 8,470,760, which claims priority to U.S. Provisional Patent Application No. 61/349,393, entitled "Colored Speckles Having Delayed Release Properties" which was filed on May 28, 2010.

FIELD OF THE INVENTION

This invention relates to non-bleeding, non-staining colored speckles for use in granular or powdered detergents such as laundry detergents and automatic dishwashing detergents. The colored speckles are comprised of a salt or salt-containing carrier and a coloring agent and are characterized as being substantially uniformly colored throughout the cross-sectional volume of the speckle.

BACKGROUND OF THE INVENTION

Recently there has been an increasing trend towards the incorporation of colored speckles into particulate detergent compositions and other consumer products. Dyes and pigments have been widely used to produce colored speckles that serve aesthetic purposes only. Novel effects such as release of color into the wash water and hueing of fabrics, however, tend to require higher colorant loadings. There is, particularly at these higher colorant loadings, a fabric staining risk associated with dye and pigment use. Thus, the need exists for colored speckles for use in detergent compositions and other consumer products that can serve both an aesthetic purpose and also provide the novel effects of release of color and hueing of fabrics without staining the substrates that come into contact with the colored speckles.

Additionally, the inclusion of colored speckles in granulated laundry detergents presents the problem of bleeding or transferring onto the powdered detergent surrounding the speckle. This results in the base powder becoming colored, which is a highly undesirable effect. Thus, the need exists for colored speckles for use in detergent compositions which do not bleed or transfer to the surrounding base powder.

The problems associated with previous attempts by others to include colored speckles in detergents include (a) fabric staining from the colorant used in the speckles and (b) bleeding and transferring of the colorant to the surrounding detergent powder. Thus, there exists a continual need for colored speckles that provide aesthetic appeal to detergent compositions, visible coloration to wash water, and hueing effects to whiten fabrics without bleeding onto the surrounding detergent granules and without staining the fabrics. The present disclosure addresses and overcomes these problems.

The colored speckles of the present disclosure are ideally suited for providing color to various compositions including, but not limited to granular detergent compositions (such as laundry detergent compositions). The colored speckles may provide non-staining, aesthetically-pleasing features to textile substrates treated therewith. They also resist bleeding or transferring to the surrounding detergent composition. Furthermore, the colored speckles of the present disclosure provide release of color, or other actives, from the salt or salt-containing carrier and provide desirable color to the wash water. For these reasons, and others that will be described herein, the present colored speckles represent a useful advance over the prior art.

BRIEF SUMMARY OF THE INVENTION

Provided herein is a colored speckle comprising: a) a majority by weight of at least one salt or salt-containing carrier material; and b) at least one coloring agent; wherein the at least one carrier material and the at least one coloring agent form a carrier-coloring agent composite, and wherein the carrier-coloring agent composite comprises a cross-sectional volume that is substantially uniformly colored by the at least one coloring agent.

Yet another alternative includes a colored speckle comprising: a) a majority by weight of at least one sodium carbonate-containing carrier material; and b) at least one polymeric coloring agent; wherein the at least one sodium carbonate-containing carrier material and the at least one polymeric coloring agent form a carrier-coloring agent composite, and wherein the carrier-coloring agent composite comprises a cross-sectional volume that is substantially uniformly colored by the at least one polymeric coloring agent.

Further provided herein is a colored speckle comprising: a) a majority by weight of compacted soda ash carrier material; and b) at least one coloring agent; wherein the at least one compacted soda ash carrier material and the at least one coloring agent form a carrier-coloring agent composite, and wherein the carrier-coloring agent composite comprises a cross-sectional volume that is substantially uniformly colored by the at least one coloring agent.

DETAILED DESCRIPTION OF THE INVENTION

All U.S. and foreign patents and patent applications disclosed in this specification are hereby incorporated by reference in their entirety.

The present disclosure relates to non-bleeding and non-staining colored speckles for use in granular detergent compositions. The speckles are further characterized in that they exhibit color on the outer surface of the speckle, as well as throughout the cross-section of the speckle. In general, this means that if one were to cut the colored speckle in half and examine a cross-section of the speckle, the color would appear to be substantially, uniformly distributed throughout that cross-section. Thus, the colored speckles may be described herein as being substantially, uniformly colored throughout the body of the speckle. The colored speckle may also be described herein as being substantially, uniformly colored throughout the cross-sectional volume of the speckle. The colored speckles of the present invention may also find applications in other consumer products outside powdered or granular detergent compositions.

The colored speckles are comprised of salt or salt-containing granules and a coloring agent. The salt or salt-containing granules act as a carrier for the coloring agent. Herein, the present disclosure describes a colored speckle and a method for making the colored speckle which provides release of the coloring agent in wash water while reducing, or even eliminating, color migration or bleed on powdered detergent.

The term "non-staining" as used herein, generally refers to a coloring agent, or a composition that contains such a coloring agent, that may be washed or removed from substrate surfaces (e.g. skin, fabric, wood, concrete) with relatively little effort and without staining the substrate to an appreciable extent.

The term "non-bleeding," as used herein, generally refers to a coloring agent-containing composition that does not substantially color the material surrounding the composition under conditions wherein the material is not intended to be colored. For example, the colored speckles of the present invention will generally be considered to be "non-bleeding" if the colored speckles fail to substantially color the surrounding powdered detergent in its unused state (i.e. while it remains in the package).

The term "water-insoluble" or "minimally water soluble," as used herein, generally refers to a material whose solubility in water at 20° C. and 1 atmosphere of pressure is less than 3 grams/100 ml of water.

The term "water-soluble," as used herein, generally refers to a material whose solubility in water at 20° C. and 1 atmosphere of pressure is greater than 3 grams/100 ml of water.

The term "salt" as used herein, generally refers to ionic compounds comprised of both cations (positively charged ions) and anions (negatively charged ions) so that the product is electrically neutral (without a net charge). These component ions may be inorganic or organic ions, monatomic or polyatomic, monovalent or multivalent.

The term "salt containing" as used herein, generally refers to a physical blend or mixture of a salt and some other component/components (organic or inorganic) that is either in the powdered form (may be referred to herein as the carrier material) or in a granulated form (may be referred to herein as granules or carrier granules). These "other" components may be salts (water-soluble salts as well as water-insoluble or minimally water-soluble salts) and other organic or inorganic materials (for example: minerals, chalk, mica, clays, etc).

The term "carrier-coloring agent composite" as used herein refers to a material or "carrier" (salt or other, single component or multi-component, powder or granule) that has at least some part of its surface in contact with a color or coloring agent. The color or coloring agent may be adsorbed to the surface of the carrier.

Carrier Material

The carrier material is preferably in the form of a salt or salt-containing granule. The colored speckle may be comprised of a majority by weight of the carrier material. The material used to produce the salt or salt-containing granule may be characterized as being comprised of at least one water-soluble salt or a mix of at least one water-soluble salt and at least one water-insoluble material. The carrier material may be characterized as being a porous material, a non-porous material, or a combination of porous and non-porous materials.

The salt or salt-containing carrier material may be selected from at least one of, but is not limited to, the following materials: lithium salts, sodium salts (such as but not limited to sodium sulfate, sodium bisulfate, sodium carbonate, sodium tripolyphosphate, sodium polyphosphate, sodium phosphates, monosodium phosphate, sodium hydrogen phosphate, sodium dihydrogen phosphate, sodium chloride, sodium bicarbonate, sodium percarbonate, sodium nitrate, sodium nitrite, sodium thiosulfate, sodium acetate, sodium bromide, sodium chlorate, sodium perchlorate, sodium chromate, sodium dichromate, sodium iodide, sodium iodate, sodium oxalate, sodium silicate, sodium sulfide, sodium sulfite, sodium bisulfite, sodium citrate, sodium malate, sodium stearate, sodium lauryl sulfate, sodium benzoate, sodium bromate, sodium formate, sodium pyrophosphate, sodium selenate, sodium periodate, sodium molybdate, sodium hydrates, and mixtures thereof), potassium salts (such as but not limited to potassium sulfate, potassium chloride, potassium acetate, potassium chlorate, potassium chromate, potassium iodide, potassium nitrate, potassium nitrite, potassium thiosulfate, potassium selenate, potassium formate, potassium bromide, potassium carbonate, potassium bicarbonate, potassium persulfate, potassium phosphate, potassium permanganate, potassium iodate, potassium fluoride, potassium bisulfate, potassium thiocyanate, potassium dihydrogen phosphate, potassium dichromate, potassium cyanide, potassium bromate, potassium benzoate, potassium arsenate, potassium azide, potassium oxalate, potassium silicate, potassium sulfite, potassium citrate, potassium hydrates, and mixtures thereof), rubidium salts, cesium salts, francium salts, beryllium salts, magnesium salts (such as but not limited to magnesium sulfate, magnesium chloride, magnesium acetate, magnesium chlorate, magnesium chloride, magnesium chromate, magnesium iodide, magnesium nitrate, magnesium thiosulfate, magnesium selenate, magnesium perchlorate, magnesium formate, magnesium bromide, magnesium sulfite, magnesium citrate, magnesium fluorosilicate, magnesium hydrates, and mixtures thereof), calcium salts (such as but not limited to calcium chloride, calcium acetate, calcium chlorate, calcium chromate, calcium iodide, calcium nitrate, calcium formate, calcium bromide, calcium bicarbonate, calcium permanganate, calcium bromate, calcium perchlorate, calcium hydrates, and mixtures thereof), strontium salts, barium salts, radium salts, scandium salts, titanium salts, zirconium salts, hafnium salts, vanadium salts, chromium salts, molybdenum salts, tungsten salts, manganese salts, iron salts (II & III), ruthenium salts, cobalt salts, iridium salts, nickel salts, palladium salts, platinum salts, copper (I & II) salts, silver salts, gold salts, zinc salts, cadmium salts, boron salts, aluminum salts, thallium salts, antimony salts, bismuth salts, ammonium salts, quaternary ammonium salts, pyridinium salts, nitrate salts (such as but not limited to sodium nitrate, ammonium nitrate, magnesium nitrate, aluminum nitrate, barium nitrate, cadmium nitrate, calcium nitrate, chromium nitrate, cobalt nitrate, cupric nitrate, iron nitrate, lead nitrate, potassium nitrate, nickel nitrate, silver nitrate, strontium nitrate, zinc nitrate, nitrate hydrates, and mixtures thereof), nitrite salts, chloride salts (such as but not limited to sodium chloride, ammonium chloride, magnesium chloride, aluminum chloride, antimony chloride, barium chloride, cadmium chloride, calcium chloride, chromium chloride, cobalt chloride, cupric chloride, ferric chloride, ferrous chloride, mercury chloride, nickel chloride, potassium chloride, strontium chloride, zinc chloride, chloride hydrates, and mixtures thereof), chlorate salts (such as but not limited to sodium chlorate, ammonium chlorate, magnesium chlorate, aluminum chlorate, barium chlorate, cadmium chlorate, calcium chlorate, cobalt chlorate, cupric chlorate, lead chlorate, potassium chlorate, silver chlorate, strontium chlorate, zinc chlorate, chlorate hydrates, and mixtures thereof), chromate salts (such as but not limited to sodium chromate, ammonium chromate, magnesium chromate, calcium chromate, copper chromate, iron chromate, potassium chromate, chromate hydrates, and mixtures thereof), cyanate salts, cyanide salts, fluoride salts, acetate salts (such as but not limited to sodium acetate, ammonium acetate, magnesium acetate, aluminum acetate, barium acetate, cadmium acetate, calcium acetate, chromium acetate, cobalt acetate, cupric acetate, lead acetate, nickel acetate, potassium acetate, strontium acetate, zinc acetate, acetate hydrates, and mixtures thereof), bromide salts (such as but not limited to sodium bromide, ammonium bromide, magnesium bromide, aluminum bromide, barium bromide, cadmium bromide, calcium bromide, chromium bromide, cobalt bromide, cupric bromide, ferric bromide, ferrous bromide, lead bromide, nickel bromide, potassium bromide, strontium bromide, zinc bromide, bromide hydrates, and mixtures thereof), boride salts, iodide salts (such as but not limited to sodium iodide, aluminum iodide, ammonium iodide, arsenic iodide, magnesium iodide, barium iodide, cadmium iodide, calcium iodide, cobalt iodide, iron iodide, nickel iodide, potassium iodide, strontium iodide, zinc iodide, iodide hydrates, and mixtures thereof), sulfate salts (such as but not limited to magnesium sulfate, sodium sulfate, cadmium sulfate, aluminum sulfate, ammonium sulfate, chromium sulfate, cobalt sulfate, cupric sulfate, iron sulfate, nickel sulfate, potassium sulfate, zinc sulfate, sulfate hydrates, and mixtures thereof), sulfite salts (such as but not limited to ammonium sulfite, potassium sulfite, sodium sulfite, magnesium sulfite, sulfite hydrates, and mixtures thereof), sulfide salts (such as but not limited to ammonium sulfide, potassium sulfide, sodium sulfide, sulfide hydrates, and mixtures thereof), sulfamate salts, sulfonate salts, carbonate salts (such as but not limited to sodium carbonate, sodium percarbonate, potassium carbonate, ammonium carbonate, carbonate hydrates, and mixtures thereof), bicarbonate salts, ascorbate salts, phosphate salts (such as but not limited to ammonium phosphate, potassium phosphate, sodium phosphate, sodium tripolyphosphate, phosphate hydrates, and mixtures thereof), polyphosphate salts (such as but not limited to sodium tripolyphosphate), citrate salts (such as but not limited to potassium citrate, sodium citrate, magnesium citrate, citrate hydrates, and mixtures thereof), oxides (such as metal oxides, zinc oxide, leaded zinc oxide, antimony oxide, and mixtures thereof), hydroxides, cyanide salts, permanganates, adipates, benzoates, fluorides, silicates (such as but not limited to sodium silicate, potassium silicate, barium silicates, silicate hydrates, and mixtures thereof), lactates, malates, perchlorates, persulfates, oxalates (such as but not limited to sodium oxalate, chromium oxalate, iron oxalate, potassium oxalate, oxalate hydrates, and mixtures thereof), organic salts, alkali metal aluminosilicates, borax, clay, silica, zeolite, diatomaceous earth, mica, talc, chalk, gypsum, lithopone, titanium dioxide, barytes, silica flatting agents, and the like, and combinations thereof.

Soda ash (e.g. sodium carbonate) may be a preferred carrier material for the colored speckles of the present invention. In one aspect, soda ash that has been compacted via a wet or a dry granulation process, as further described herein, to form compacted soda ash carrier material may be used as the carrier material.

Compacted soda ash carrier material may be formed by exposing the soda ash carrier material to pressure or force, which causes the soda ash material to be compacted or pressed together into a larger form or shape; this larger form or shape is subsequently broken apart by mechanical agitation to form smaller pieces which are then passed through a sieve for particle size selection. The step of applying pressure or force to the soda ash may be achieved by passing the soda ash carrier material between at least two cylindrical rollers in a process known as roller compaction. To form colored speckles comprised of colored compacted soda ash, a coloring agent may be applied to the soda ash carrier material prior to the compaction process. In another aspect, other carrier materials disclosed herein may also be formed into compacted carrier material by these methods.

It may be preferable that the carrier material exhibits a particular range of particle size, as determined, for example, by sieving techniques according to ASTM D1921-06 ("Standard Test Method For Particle Size (Sieve Analysis) of Plastic Materials"). Alternative methods known to those skilled in the art may also be utilized for determining particle size. For example, other sieving techniques may be used or electronic laboratory equipment known for determining particle size may alternatively be employed. For the carrier materials of the present invention, it may be preferably that the carrier materials exhibit an average particle size of about 0.1 mm to about 2 mm, more preferably an average particle size of about 0.3 mm to about 1.5 mm.

Coloring Agent

The coloring agent of the present invention is preferably a polymeric colorant. The term "polymeric colorant" generally refers to a colorant having at least one chromophore portion attached to at least one oligomeric or polymeric chain, wherein the chain has at least three repeating units. The oligomeric or polymeric constituent can be bound to the chromophore via any suitable means, such as a covalent bond, an ionic bond, or suitable electrostatic interaction. Generally, the polymeric colorant may be characterized by having an absorbance in the range of between about 300 nanometers and about 900 nanometers, as measured by UV-vis spectroscopy.

As a function of its manufacturing process, the polymeric colorant has a molecular weight that is typically represented as a molecular weight distribution. Accordingly, the molecular weight of the polymeric colorant is generally reported as an average molecular weight, as determined by its molecular weight distribution.

The chromophore group of the colorant may vary widely, and may include compounds characterized in the art as dyestuffs or as pigments. The actual group used will depend to a large extent upon, for instance, the desired color and colorfastness characteristics. The chromophore group may be attached to at least one polyalkyleneoxy-substituent through a suitable linking moiety of nitrogen, oxygen, sulfur, etc.

Examples of chromophore groups include nitroso, nitro, azo (including monoazo, disazo, trisazo, tetrakisazo, polyazo, formazan, azomethine and metal complexes thereof), stilbene, bis-stilbene, biphenyl, oligophenethylene, fluorene, coumarin, napthalamide, diarylmethane, triarylmethane, xanthene acridine, quinoline, methine (including polymethine), thiazole, indamine, indophenol, azine, thiazine, oxazine, aminoketone, hydroxyketone, anthraquinone (including anthrapyrazolines, anthrone, anthrapyridone, anthrapyrimidine, flavanthrone, pyranthrone, benzanthrone, perylene, perinone, naphthalimide and other structures formally related to anthraquinone), indigoid (including thioindigoid), phthalocyanine chromophore groups, and mixtures thereof.

Examples of suitable polymeric chains are polyalkyleneoxy chains. The term "polyalkyleneoxy," as used herein, generally refers to molecular structures containing the following repeating units: —CH$_2$CH$_2$O—, CH$_2$CH$_2$CH$_2$O—, —CH$_2$CH$_2$CH$_2$CH$_2$O—, —CH$_2$CH(CH$_3$)O—, —CH$_2$CH(CH$_2$CH$_3$)O—CH$_2$CH$_2$CH(CH$_3$)O—, CH$_2$CH(O—)(CH$_2$O—), and any combinations thereof.

Typical of such groups which may be attached to the chromophore group are the polymeric epoxides, such as the polyalkylene oxides and copolymers thereof. Typical polyalkylene oxides and copolymers of same which may be employed to provide the colorants include those made from alkylene oxide monomers containing from two to twenty carbon atoms, or more preferably, from two to six carbon atoms. Examples include: polyethylene oxides; polypropylene oxides; polybutylene oxides; oxetanes; tetrahydrafurans; copolymers of polyethylene oxides, polypropylene oxides and polybutylene oxides; and other copolymers including block copolymers, in which a majority of the polymeric substituent is polyethylene oxide, polypropylene oxide and/or polybutylene oxide. Further, such polyalkyleneoxy group may have an average molecular weight in the range of from about 132 to about 10,000, preferably from about 176 to about 5000.

It is to be understood that because the colorants may not ordinarily be chemically bound to the carrier, the precise chemical identity of the end group on the polyalkyleneoxy group may not be critical insofar as the proper functioning of the colorant is concerned in the composition. With this consideration in mind, certain most preferred colorants will be defined wherein certain end groups will be identified. Such recitation of end groups is not to be construed as limiting the invention in its broader embodiments in any way. According to such a most preferred embodiment the colorants may be characterized as follows:

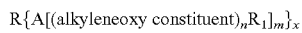

wherein R is an organic chromophore group, A is a linking moiety in said organic chromophore group selected from the group consisting of N, O, $SO_2$ or $CO_2$, the alkylene moiety of the alkyleneoxy constituent contains from 2 to about 4 carbon atoms, n is an integer of from 2 to about 230, m is 1 when A is O, $SO_2$, $CO_2$ and 1 or 2 when A is N, x is an integer of from 1 to 5, and the product of n times x times m (n.m.x) is from 2 to about 230, and $R_1$ is a member of the group consisting of

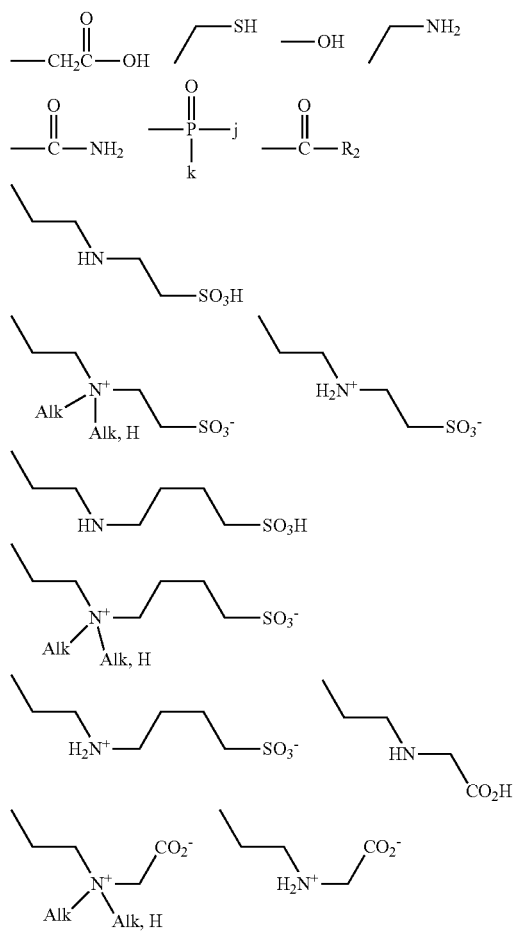

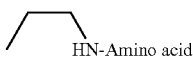

and sulfonates and sulfates of each of the members of said group, wherein $R_2$ is H, an alkyl radical containing up to about 20 carbon atoms or carboxy-terminated alkyl radical containing up to about 20 carbon atoms, j and k are OH, OM or $OR_3$ wherein M is a cation moiety of an alkali metal, an alkaline earth metal, transition metal, e.g., nickel, etc. or ammonium, and $R_3$ is an alkyl radical containing up to about 20 carbon atoms.

The oligomeric constituent can be any suitable constituent including, but not limited to, oligomeric constituents selected from the group consisting of (i) oligomers comprising at least three monomers, or repeating units, selected from the group consisting of $C_2$-$C_{20}$ alkyleneoxy groups, glycidol groups, and glycidyl groups, (ii) aromatic or aliphatic oligomeric esters conforming to structure (I)

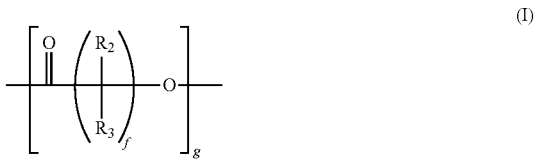

and (iii) combinations of (i) and (ii). In structure (I), $R_2$ and $R_3$ are independently selected from the group consisting of hydrogen and $C_1$-$C_{10}$ alkyl groups, f is an integer between and including 1 and 10, and g is any positive integer or fraction between and including 1 and 20. As will be understood by those of ordinary skill in the art, suitable values for g include both integers and fractions because the length of the oligomeric constituent on the individual polymeric colorant molecules may vary. Thus, the value for g represents an average length of the ester chain for a given sample or collection of polymeric colorant molecules. In certain embodiments, the polymeric colorant can comprise one or more oligomeric constituents consisting of three or more ethylene oxide monomer groups.

Exemplary polymeric colorants include Liquitint® polymeric colorants, Cleartint® polymeric liquid concentrate colorants, Reactint® polymeric colorants, and Palmer® polymeric colorants, all of which are available from Milliken Chemical, a division of Milliken & Company of Spartanburg, S.C. Liquitint® polymeric colorants are characterized in that they are water soluble, non-staining, colorants. They are widely used in laundry detergents, fabric softeners, and other consumer and industrial cleaning products. Liquitint® polymeric colorants are generally bright liquid colorants which, depending on the specific colorant, exhibit varying degrees of solubility in water. These colorants may also be characterized as being generally compatible with other chemicals present in their end-use formulations and are typically easy to handle. Liquitint® polymeric colorants may be used to provide color in both aqueous and solid systems. The unique polymeric nature of Liquitint® polymeric colorants provides reduced staining to skin, textiles, hard surfaces, equipment, and the like.

Cleartint® polymeric liquid concentrate colorants are specially designed liquid colorants often used for coloring clarified polypropylene articles. These colorants may be incorporated into polypropylene resins easily without detrimentally affecting the clarity of the article to provide transparent, clear and brightly colored polypropylene articles. Cleartint® liquid concentrate polymeric colorants are oligomeric coloring materials which combine the exceptional aesthetics of dyes with the migration resistance of pigments. These colorants may be used as light tints to mask residual haze, or they may be used for deep, rich shades that are not possible with pigment colorants. Cleartint® liquid concentrate polymeric colorants allow clarified polypropylene to rival the beauty of higher cost plastic materials. The technical and physical property benefits of clarified polypropylene may be exploited without sacrificing product aesthetics.

Reactint® polymeric colorants are liquid polymeric colorants useful for coloring polyurethane and other thermoset resins. These colorants are reactive polymeric colorants that consist of chromophores which are chemically bound to polyols. This arrangement allows the polymeric colorant to react into the polyurethane polymer matrix. Unlike pigment pastes, which are dispersions of solid particles in a liquid carrier, Reactint® polymeric colorants are 100% homogeneous liquids that are soluble in polyol and will not settle over time. Because of this pure liquid and easy to disperse nature, it is possible to blend Reactint® colorants in-line and on-the-fly, while producing polyurethane foams and resins.

Palmer® polymer colorants are liquid colorants specially developed for use in washable applications, such as in markers, paints and other art products. They contain no heavy metals, are non-toxic, and have excellent non-staining properties on skin, fabric and other surfaces. Palmer® polymeric colorants have very good compatibility with aqueous ink formulations and provide bright colors.

It is also contemplated to be within the scope of the present invention that other colorants may be utilized as the coloring agent. For example, a colorant selected from one or more of the following classes may be suitable for use as the coloring agent in the colored speckle: acid dyes, basic dyes, direct dyes, solvent dyes, vat dyes, mordant dyes, indigoid dyes, reactive dyes, disperse dyes, sulfur dyes, fluorescent dyes; pigments, both organic and inorganic; natural colorants; and the like.

Optional Additive—Release-Rate Modifier (Water-Soluble Salt)

A release-rate modifier such as a water-soluble salt may optionally be included in the colored speckle of the present invention. A water-soluble salt (also referred to herein as the "release-rate modifier") is generally used to effectuate the delayed release of the coloring agent from the carrier-coloring agent composite material. Without being bound by theory, this activity occurs through a reaction between the water-soluble salt (release-rate modifier) and the (water-soluble) salt present in the carrier agent material or granule to form a water-insoluble salt coating thereon. Thus, a colored speckle having delayed color release properties is made.

There may be multiple water-soluble salts present in the carrier granule that could react with the release-rate modifier to give the same insoluble precipitate (for example if aqueous magnesium sulfate is applied to granules containing a mixture of soda ash and potassium carbonate; both will react with the magnesium sulfate to give the same precipitate of magnesium carbonate) or multiple insoluble precipitates (for example if aqueous magnesium sulfate is applied to granules containing a mixture of soda ash and sodium phosphate; each will react with the magnesium sulfate to give distinct precipitates of magnesium carbonate and magnesium phosphate respectively) or there may be at least one such water-soluble carrier salt present (to react with the release-rate modifier).

Similarly, a carrier material or granule/speckle may be treated with a solution of multiple release-rate modifiers/at least one release rate modifier.

The mechanism by which two water-soluble salts combine to form a water-insoluble precipitate (salt) is an example of a displacement/replacement reaction. When two water-soluble salts, AB and CD, are dissolved in water, they tend to dissociate and yield a solution of $A^+$, $B^-$, $C^+$, and $D^-$ ions (monovalent ions are used herein for exemplary purposes and should not be considered limiting). Now, by further chemical reaction, these ions may combine to give AD and CB. Additionally, it is possible that one of the salts (AD or CB) may be insoluble (or minimally soluble) in water. Thus, it will precipitate out of solution.

As one non-limiting example of a displacement/replacement reaction, the combination of sodium carbonate and magnesium sulfate (in the presence of water) results in the formation of a white precipitate of magnesium carbonate (due to its minimal solubility in water at room temperature). In the same way, when an aqueous solution of magnesium sulfate is added to soda ash granules (colored or un-colored), an insoluble/minimally soluble precipitate of magnesium carbonate is generated which deposits on/coats the surface of the soda ash granules and delays dissolution of the granules themselves and/or consequently delays the release of whatever active (such as a coloring agent) may be present on or within/throughout the soda ash material.

When added to an aqueous solution, these treated colored speckles (such that an insoluble salt coating is present on their surface) typically dissolve or disintegrate at a slower rate than speckles that have no insoluble salt deposited on their surface. Accordingly, the release of coloring agent (or other active) contained therein occurs at a slower rate than speckles that have no insoluble salt deposited on their surface. The water-insoluble salt coating generally remains intact (for the period of observation of 10 to 15 minutes) and is left behind as a by-product of the colored speckle.

The water-soluble salt to be used as a release rate modifier may be any material that is capable of reacting with at least one salt in the carrier material to form or precipitate a water-insoluble or minimally water-soluble salt or salts. The choice of water-soluble salt to be used as release-rate modifier may be dependent on the type of salt or salts present in the carrier granule used to make the colored speckles. A carrier material or granule/speckle may be treated with a single release-rate modifier or multiple release-rate modifiers (in other words, at least one release rate modifier).

The at least one water-soluble salt may be selected from the group consisting of water-soluble salts of beryllium, magnesium, calcium, strontium, barium, lead, radium, scandium, titanium, zirconium, hafnium, vanadium, chromium, molybdenum, tungsten, manganese, iron(II & III), ruthenium, cobalt, iridium, nickel, palladium, platinum, mercury, copper (I & II), silver, gold, zinc, cadmium, boron, aluminum, thallium, antimony, bismuth, pyridinium, ammonium, quaternary ammonium, nitrate, nitrite, hydroxide, oxide, oxalate, phosphate, silicate, sulfide, carbonate, chromate, chlorate, sulfate, sulfite, acetate, citrate, iodide, bromide, chloride, hydrates thereof, and mixtures thereof.

Water-soluble salts of magnesium may be selected from the group consisting of magnesium sulfate, magnesium chloride, magnesium acetate, magnesium chlorate, magnesium chromate, magnesium iodide, magnesium nitrate, magnesium perchlorate, magnesium bromide, magnesium sulfite, magnesium citrate, magnesium hydrates, and mixtures thereof.

Water-soluble salts of sodium may be selected from the group consisting of sodium sulfate, sodium bisulfate, sodium carbonate, sodium tripolyphosphate, sodium polyphosphate, sodium phosphates, monosodium phosphate, sodium hydrogen phosphate, sodium dihydrogen phosphate, sodium chloride, sodium bicarbonate, sodium percarbonate, sodium nitrate, sodium nitrite, sodium acetate, sodium bromide, sodium chlorate, sodium perchlorate, sodium chromate, sodium dichromate, sodium iodide, sodium iodate, sodium oxalate, sodium silicate, sodium sulfide, sodium sulfite, sodium bisulfite, sodium citrate, sodium stearate, sodium benzoate, sodium bromate, sodium formate, sodium hydrates, and mixtures thereof.

Water-soluble salts of potassium may be selected from the group consisting of potassium sulfate, potassium chloride, potassium acetate, potassium chlorate, potassium chromate, potassium iodide, potassium nitrate, potassium nitrite, potassium formate, potassium bromide, potassium carbonate, potassium bicarbonate, potassium persulfate, potassium phosphate, potassium iodate, potassium fluoride, potassium bisulfate, potassium dihydrogen phosphate, potassium dichromate, potassium bromate, potassium benzoate, potassium oxalate, potassium silicate, potassium sulfite, potassium citrate, potassium hydrates, and mixtures thereof.

Water-soluble salts of calcium may be selected from the group consisting of calcium chloride, calcium acetate, calcium chlorate, calcium chromate, calcium iodide, calcium nitrate, calcium formate, calcium bromide, calcium bicarbonate, calcium permanganate, calcium bromate, calcium perchlorate, calcium hydrates, and mixtures thereof.

Water-soluble chloride salts may be selected from the group consisting of sodium chloride, ammonium chloride, magnesium chloride, aluminum chloride, antimony chloride, barium chloride, cadmium chloride, calcium chloride, chromium chloride, cobalt chloride, cupric chloride, ferric chloride, ferrous chloride, mercury chloride, nickel chloride, potassium chloride, strontium chloride, zinc chloride, chloride hydrates, and mixtures thereof.

Water-soluble sulfate salts may be selected from the group consisting of magnesium sulfate, sodium sulfate, cadmium sulfate, aluminum sulfate, ammonium sulfate, chromium sulfate, cobalt sulfate, cupric sulfate, iron sulfate, nickel sulfate, potassium sulfate, zinc sulfate, sulfate hydrates, and mixtures thereof.

Water-soluble sulfide salts may be selected from the group consisting of ammonium sulfide, potassium sulfide, sodium sulfide, sulfide hydrates, and mixtures thereof.

Water-soluble carbonate salts may be selected from the group consisting of sodium carbonate, sodium percarbonate, potassium carbonate, ammonium carbonate, carbonate hydrates, and mixtures thereof.

Water-soluble phosphate salts may be selected from the group consisting of ammonium phosphate, potassium phosphate, sodium phosphate, sodium tripolyphosphate, phosphate hydrates, and mixtures thereof.

Water-soluble silicates may be selected from the group consisting of sodium silicate, potassium silicate, barium silicates, silicate hydrates, and mixtures thereof.

Water-soluble acetate salts may be selected from the group consisting of sodium acetate, ammonium acetate, magnesium acetate, aluminum acetate, barium acetate, cadmium acetate, calcium acetate, chromium acetate, cobalt acetate, cupric acetate, lead acetate, nickel acetate, potassium acetate, strontium acetate, zinc acetate, acetate hydrates, and mixtures thereof.

Water-soluble bromide salts may be selected from the group consisting of sodium bromide, ammonium bromide, magnesium bromide, aluminum bromide, barium bromide, cadmium bromide, calcium bromide, chromium bromide, cobalt bromide, cupric bromide, ferric bromide, ferrous bromide, lead bromide, nickel bromide, potassium bromide, strontium bromide, zinc bromide, bromide hydrates, and mixtures thereof.

Water-soluble chlorate salts may be selected from the group consisting of sodium chlorate, ammonium chlorate, magnesium chlorate, aluminum chlorate, barium chlorate, cadmium chlorate, calcium chlorate, cobalt chlorate, cupric chlorate, lead chlorate, potassium chlorate, silver chlorate, strontium chlorate, zinc chlorate, chlorate hydrates, and mixtures thereof.

Water-soluble chromate salts may be selected from the group consisting of sodium chromate, ammonium chromate, magnesium chromate, calcium chromate, copper chromate, iron chromate, potassium chromate, chromate hydrates, and mixtures thereof.

Water-soluble iodide salts may be selected from the group consisting of sodium iodide, aluminum iodide, ammonium iodide, arsenic iodide, magnesium iodide, barium iodide, cadmium iodide, calcium iodide, cobalt iodide, iron iodide, nickel iodide, potassium iodide, strontium iodide, zinc iodide, iodide hydrates, and mixtures thereof.

Water-soluble nitrate salts may be selected from the group consisting of sodium nitrate, ammonium nitrate, magnesium nitrate, aluminum nitrate, barium nitrate, cadmium nitrate, calcium nitrate, chromium nitrate, cobalt nitrate, cupric nitrate, iron nitrate, lead nitrate, potassium nitrate, nickel nitrate, silver nitrate, strontium nitrate, zinc nitrate, nitrate hydrates, and mixtures thereof.

Water-soluble oxalate salts may be selected from the group consisting of sodium oxalate, chromium oxalate, iron oxalate, potassium oxalate, oxalate hydrates, and mixtures thereof.

Water-soluble sulfite salts may be selected from the group consisting of ammonium sulfite, potassium sulfite, sodium sulfite, magnesium sulfite, sulfite hydrates, and mixtures thereof.

Water-soluble citrate salts may be selected from the group consisting of potassium citrate, sodium citrate, magnesium citrate, citrate hydrates, and mixtures thereof.

Water-soluble salts may be selected from the group consisting of water soluble alkaline earth metal salts, hydrates thereof, and mixtures thereof.

If the carrier granule contains at least one water-soluble phosphate or carbonate (such as but not limited to soda ash) or sulphite salt, then the release-rate modifier may be selected from at least one water-soluble salt of at least one of the following cations: beryllium, magnesium (such as but not limited to magnesium sulfate, magnesium chloride), calcium, strontium, barium, radium, scandium, titanium, zirconium, hafnium, vanadium, chromium, molybdenum, tungsten, manganese, iron(II & III), ruthenium, cobalt, iridium, nickel, palladium, platinum, copper (I & II), silver, gold, zinc, cadmium, boron, aluminum, thallium, antimony, bismuth, pyridinium, and mixtures thereof. For example, the release-rate modifier may be selected from $MgSO_4$ or $MgCl_2$, and the like, and combinations thereof.

If the carrier granule contains at least one water-soluble hydroxide salt, then the release-rate modifier may be selected from at least one water-soluble salt of at least one of the following cations: beryllium, magnesium (such as but not limited to magnesium sulfate, magnesium chloride), calcium, scandium, titanium, zirconium, hafnium, vanadium, chromium, molybdenum, tungsten, manganese, iron(II & III), ruthenium, cobalt, iridium, nickel, palladium, platinum, copper (I & II), silver, gold, zinc, cadmium, boron, aluminum, antimony, bismuth, pyridinium, and mixtures thereof.

If the carrier granule contains at least one water-soluble sulfide salt, then the release-rate modifier may be selected from at least one water-soluble salt of at least one of the following cations: scandium, titanium, zirconium, hafnium, vanadium, chromium, molybdenum, tungsten, manganese, iron(II & III), ruthenium, cobalt, iridium, nickel, palladium, platinum, copper (I & II), silver, gold, zinc, cadmium, boron, aluminum, thallium, antimony, bismuth, pyridinium, and mixtures thereof.

If the carrier granule contains at least one water-soluble sulfate salt, then the release-rate modifier may be selected from at least one water-soluble salt of at least one of the following cations: calcium, strontium, barium, silver, lead, radium, and mixtures thereof.

If the carrier granule contains at least one water-soluble chloride or bromide or iodide salt, then the release-rate modifier may be selected from at least one water-soluble salt of at least one of the following cations: silver, lead, mercury, copper, thallium, and mixtures thereof.

If the carrier granule contains at least one water-soluble aluminum salt, then the release-rate modifier may be selected from at least one water-soluble salt of at least one of the following anions: hydroxide, oxide, oxalate, phosphate, silicate, and mixtures thereof.

If the carrier granule contains at least one water-soluble ammonium salt, then the release-rate modifier may be selected from at least one water-soluble oxalate salt.

If the carrier granule contains at least one water-soluble antimony salt, then the release-rate modifier may be selected from at least one water-soluble salt of at least one of the following anions: oxide, oxalate, and mixtures thereof.

If the carrier granule contains at least one water-soluble arsenic salt, then the release-rate modifier may be selected from at least one water-soluble salt of at least one of the following anions: oxide, sulfide, and mixtures thereof.

If the carrier granule contains at least one water-soluble barium salt, then the release-rate modifier may be selected from at least one water-soluble salt of at least one of the following anions: carbonate, chromate, oxalate, phosphate, sulfate, sulfite, and mixtures thereof.

If the carrier granule contains at least one water-soluble bismuth salt, then the release-rate modifier may be selected from at least one water-soluble salt of at least one of the following anions: acetate, iodide, oxide, phosphate, silicate, sulfide, and mixtures thereof.

If the carrier granule contains at least one water-soluble cadmium salt, then the release-rate modifier may be selected from at least one water-soluble salt of at least one of the following anions: carbonate, chromate, hydroxide, oxide, oxalate, phosphate, silicate, sulfide, sulfite, and mixtures thereof.

If the carrier granule contains at least one water-soluble calcium salt, then the release-rate modifier may be selected from at least one water-soluble salt of at least one of the following anions: carbonate, hydroxide, oxide, oxalate, phosphate, silicate, sulfate, sulfide, sulfite, citrate, and mixtures thereof.

If the carrier granule contains at least one water-soluble chromium salt, then the release-rate modifier may be selected from at least one water-soluble salt of at least one of the following anions: hydroxide, iodide, oxide, phosphate, sulfide, sulfite, and mixtures thereof.

If the carrier granule contains at least one water-soluble cobalt salt, then the release-rate modifier may be selected from at least one water-soluble salt of at least one of the following anions: carbonate, chromate, hydroxide, oxide, oxalate, phosphate, silicate, sulfide, sulfite, and mixtures thereof.

If the carrier granule contains at least one water-soluble copper salt, then the release-rate modifier may be selected from at least one water-soluble salt of at least one of the following anions: carbonate, hydroxide, oxide, oxalate, phosphate, sulfide, and mixtures thereof.

If the carrier granule contains at least one water-soluble ferric salt, then the release-rate modifier may be selected from at least one water-soluble salt of at least one of the following anions: hydroxide, oxide, phosphate, sulfide, and mixtures thereof.

If the carrier granule contains at least one water-soluble ferrous salt, then the release-rate modifier may be selected from at least one water-soluble salt of at least one of the following anions: carbonate, chromate, hydroxide, oxide, oxalate, phosphate, silicate, sulfite, sulfide, and mixtures thereof.

If the carrier granule contains at least one water-soluble lead salt, then the release-rate modifier may be selected from at least one water-soluble salt of at least one of the following anions: bromide, carbonate, chloride, chromate, hydroxide, iodide, oxide, oxalate, phosphate, silicate, sulfate, sulfite, sulfide, and mixtures thereof.

If the carrier granule contains at least one water-soluble magnesium salt, then the release-rate modifier may be selected from at least one water-soluble salt of at least one of the following anions: carbonate, hydroxide, oxide, oxalate, phosphate, silicate, and mixtures thereof.

If the carrier granule contains at least one water-soluble mercury(II) salt, then the release-rate modifier may be selected from at least one water-soluble salt of at least one of the following anions: bromide, carbonate, chromate, iodide, oxide, oxalate, sulfide, and mixtures thereof.

If the carrier granule contains at least one water-soluble mercury (I) salt, then the release-rate modifier may be selected from at least one water-soluble salt of at least one of the following anions: acetate, bromide, carbonate, chloride, chromate, iodide, oxide, oxalate, sulfate, sulfide, and mixtures thereof.

If the carrier granule contains at least one water-soluble nickel salt, then the release-rate modifier may be selected from at least one water-soluble salt of at least one of the following anions: carbonate, chlorate, hydroxide, oxide, oxalate, phosphate, sulfide, sulfite, and mixtures thereof.

If the carrier granule contains at least one water-soluble silver salt, then the release-rate modifier may be selected from at least one water-soluble salt of at least one of the following anions: acetate, bromide, carbonate, chloride, chromate, iodide, oxide, oxalate, phosphate, sulfate, sulfide, sulfite, and mixtures thereof.

If the carrier granule contains at least one water-soluble strontium salt, then the release-rate modifier may be selected from at least one water-soluble salt of at least one of the following anions: carbonate, chromate, hydroxide, oxide, oxalate, phosphate, silicate, sulfate, sulfide, sulfite, and mixtures thereof.

If the carrier granule contains at least one water-soluble zinc salt, then the release-rate modifier may be selected from at least one water-soluble salt of at least one of the following anions: carbonate, chromate, hydroxide, oxide, oxalate, phosphate, silicate, sulfide, sulfite, and mixtures thereof.

The amount of water-soluble salt (release-rate modifier) necessary to form the water-insoluble salt coating on the colored speckle may vary depending upon the nature of the salt or salt-containing carrier material and the desired performance of the resulting colored speckle. The thickness of the water-insoluble salt coating may affect the speed with which the coloring agent is released from the granule. A thicker coating layer may prolong the time it takes for the coloring agent to release from the granule. In comparison, a thinner coating may allow the coloring agent to release more quickly. As a result, the optimum ratio of salt or salt-containing carrier to release-rate modifier may be the highest carrier to release-rate modifier ratio at which desired controlled color release is enabled and which does not compromise bleed protection.

Thus, to effectuate the delayed release of a coloring agent from a carrier granule, a water-insoluble or minimally water-soluble salt may be applied to a carrier-coloring agent composite. The salt may be applied to the composite as a uniform coating or as a non-uniform coating. The water-insoluble or minimally water-soluble salt coating acts to delay the release of the coloring agent from the carrier. This activity occurs through a reaction between the water-soluble salt (release-rate modifier) and the (water-soluble) salt present in the carrier agent material or granule to form a water-insoluble salt coating thereon. The thickness of the coating (or the amount of water-insoluble or minimally water-soluble salt) may affect the speed with which the coloring agent is released from the granule. A thicker coating layer (or greater the amount of water-insoluble or minimally water-soluble salt) may prolong the time it takes for the coloring agent to release from the granule. In comparison, a thinner coating may allow the coloring agent to release more quickly. Thus, the release of coloring agent from the carrier may be controlled by various factors, such as the thickness of the water-insoluble or minimally water-soluble salt coating applied to the carrier-coloring agent composite.

The water-insoluble salt coating formed on the surface of the colored speckle may be prepared by combining two water-soluble salt compounds in an aqueous environment and allowing the salt compounds to react with each other to form a water-insoluble salt precipitate and/or coating. Thus, one non-limiting method for preparing the water-insoluble salt coating includes applying a water soluble salt (A) to the surface of a granule comprised of water soluble salt (B) to yield a water-insoluble or minimally water-soluble precipitate of a third salt (C) that results in a delay in the release of color (or other active) from the surface or interior of the salt or salt-containing granule (B).

In one non-limiting embodiment, a colored speckle having delayed release of color may be prepared by wetting the surface of a soda ash-based carrier-coloring agent composite with a solution of either magnesium sulfate or magnesium chloride. The soda ash reacts with the magnesium sulfate salt solution (or magnesium chloride solution) to yield a precipitate of water-insoluble or minimally water-soluble magnesium carbonate that is present as a coating on the surface of the carrier-coloring agent composite. The coating imparts delayed solubility, and hence delayed color release, to the soda ash speckle.

One method for forming colored speckles having delayed color release properties includes the steps of providing uncolored carrier granules and loading the carrier granules into a rotating drum or other suitable mechanical device. Heat may or may not be applied to the drum. The drum may or may not have baffles or other protrusions attached to its interior walls.

A coloring agent may be added to the rotating drum. The coloring agent may be added, preferably in the form of an aqueous solution, to the drum using any conventional means for adding materials to a container. For example, the coloring agent may be sprayed into the drum. The coloring agent thus comes into contact with the carrier. The coloring agent may provide a substantially uniform coating on and/or into the carrier Next, the water-soluble salt (the "release-rate modifier"), preferably in the form of an aqueous solution, may be added to the carrier-coloring agent composite that remains in the rotating drum. The water-soluble salt may be added to the drum using any conventional means for adding materials to a container. For example, the water-soluble salt may be sprayed into the drum. The water-soluble salt thus comes into contact with the carrier-coloring agent composite. The water-soluble salt may provide a substantially uniform coating on and/or into the carrier-coloring agent composite (either by itself or through precipitation of a salt through reaction with salt/salts in carrier granule or both). The resulting colored speckle may have a final color-on-speckle loading of 0.01% to 10%, more preferably of 0.1% to 5%.

The colored speckles may then be dried. Drying may be accomplished by any conventional means known for drying particulate materials.

The general methods for preparing the colored speckle described herein may not be construed as limiting the scope of the present invention. It should be possible, by way of alternative processing methods, to combine the carrier, coloring agent, and water-soluble (release-rate modifier) to produce a colored speckle which exhibits similar delayed color release profiles for the coloring agent, as well as other desired features, as the colored speckles produced by the general methods described herein and by their equivalent methods as known to those skilled in the art. For instance, it may be possible to combine the coloring agent and the water-soluble salt (release-rate modifier) together into a mixture and then spray or otherwise apply the mixture to the carrier. It might also be possible to subsequently add additional coloring agent to the carrier to create a colored speckle having an initial release of color and then having a subsequent, delayed release of color. Also, it may be possible that a colored speckle having the desired characteristics may be manufactured by adding the carrier, the coloring agent, and the water-soluble salt (release-rate modifier) together in one step. It may also be possible that a colored speckle having the desired characteristics may be manufactured by adding the coloring agent to the carrier material prior to granulation (in the powdered form), granulating this colored powder and then adding the water-soluble salt (release-rate modifier). It may also be possible that a colored speckle having the desired characteristics may be manufactured by adding the coloring agent and the releasing agent together in one step to the carrier material prior to granulation (in the powdered form) followed by granulation.

Thus, in one non-limiting embodiment, the structural arrangement of carrier to coloring agent to water-insoluble salt may be achieved by adding a coloring agent to the salt or salt-containing carrier either prior-to or during the granulation process such that the resulting colored granule has color uniformly distributed throughout its body or only on its surface or non-uniformly distributed throughout its body. For example, in some cases the coloring agent may be added to a soda ash material prior-to or during the granulation process. In this instance, the coloring agent may be distributed uniformly throughout the body of the granule.

Alternatively, the structural arrangement of carrier to coloring agent to water-insoluble salt may be achieved by adding a coloring agent to the salt or salt-containing carrier after the granulation process such that the resulting colored granule has color only on its surface or non-uniformly distributed throughout its body.

Further, in yet another non-limiting embodiment, the structural arrangement of carrier to coloring agent to water-insoluble salt may be achieved by adding a coloring agent to the inner walls or surfaces of the salt or salt-containing granule before application of the water-insoluble or minimally water-soluble salt.

Thus, a release-rate modifier may be included to form a protective coating on the colored speckle to aid in the delayed release of a coloring agent from the speckle. Alternatively, a release-rate modifier may not be desirable for inclusion, depending upon the end-use characteristics of the colored speckle that are needed; as such, the colored speckle of the present invention may be free-from any protective coatings.

Additional Optional Additives

Additional optional additives that may be included in the colored speckles include perfumes, pigments, enzymes, bleach activators, bleaches, bleach catalysts, bleach stabilizers, foam regulators (foam boosters and antifoam agents), fluorescent whitening agents, soil repellents, corrosion inhibitors, soil antiredeposition agents, soil release agents, dye transfer inhibitors, builders, complexing agents, ion exchangers, buffering agents, and mixtures thereof. Bleed inhibitors such as film forming polymers or polymeric coatings may also be included. These additives may be included as one or more additional components comprising the colored speckle, in addition to the coloring agent and the salt or salt-containing carrier.

Methods For Forming the Colored Speckle Having Substantially Uniform Color Throughout There are several methods that may be employed to obtain a colored speckle having a cross-sectional volume that is substantially uniformly colored by at least one coloring agent (wherein the coloring agent is present within the interior surfaces of the carrier material as well as on the exterior surface of the carrier material). The colored speckles made by the methods described herein have at least one coloring agent substantially uniformly distributed throughout the carrier material.

In one aspect, the method includes a preliminary step wherein the coloring agent is applied to a powdered form of the carrier material (prior to the granulation) followed by subsequent granulation. Alternatively, the coloring agent may be introduced to the carrier material during the granulation process. More specifically, the colored speckle may be made, for example, by using techniques that include agglomeration, spray drying, mechanical mixing, extrusion and the like.

The process of agglomeration includes tumbling the carrier material in an enclosed rotating container (such as a rotating drum) while at the same time being sprayed with a coloring agent and, optionally, an adhesive agent (that may contain the coloring agent). Water soluble adhesive agents that may be used are selected from organic materials such as starches (for example, corn starch, tapioca starch, dextrin and other partially hydrolyzed or so-called "water-soluble" starches) and gums (for example, gum tragacanth and other water-soluble gums and water-soluble glues); inorganic materials such as silicates, and mixtures thereof.

In one aspect, pressure agglomeration may be utilized to form the colored speckles of the present invention. One example of pressure agglomeration that may be suitable is roller compaction. In this process, the carrier material, the coloring agent, and any other optional ingredients are first mixed together to form a colored granular mixture. This material is then forced between two compaction rolls (e.g. cylindrical rollers) that apply a pressure to said mixture so that the rotation of the rolls transforms the mixture into a compacted sheet and/or flake. This compacted sheet and/or flake is then broken up to form colored granules particles. These colored granules or particles are characterized as having color uniformly distributed throughout their cross-sectional volume.

The compacted sheet and/or flake produced by the pressure agglomeration process may be broken up into colored granules or particles by any suitable method for reducing the size of the sheet and/or flake. For example, the sheet and/or flake may be reduced in size by cutting, chopping or breaking the sheet/flake to produce the desired size. Additionally, the colored granules or particles may be subsequently exposed to a process which further refines their shape, e.g. such as a process which causes the particles to become rounded (to obtain round or spherical granules) according to the diameter size as defined herein before.

Additional steps of tumbling and sieving, as known to those skilled in the art, may also be employed during this process. The step of tumbling aids the manufacturing process by mechanically abrading the colored speckles to achieve relatively uniform size and shape of the speckles. The step of sieving aids the manufacturing process by enabling the separation of colored speckles according to distinct particle size.

In general, with all other characteristics being relatively equal (color loading, particle size, etc.), colored speckles made according to the methods described herein (wherein at least one coloring agent is applied to the carrier material prior to/or during a granulation process) may exhibit a lower concentration of coloring agent on the exterior surface of the speckle, when compared to colored speckles wherein the coloring agent is applied only to the exterior surface of the carrier material (e.g. the coloring agent is sprayed on the exterior surface of the carrier material). This may be explained by the fact that colored speckles of the present invention contain coloring agent distributed throughout the entire cross-sectional volume of the color speckle, rather than just being present on only the surface of the speckle. Thus, the colored speckles of the present invention may contain a greater amount of colored volume, when compared with the amount of colored volume exhibited by similarly sized colored speckles having color present only on the exterior surface of the speckle.

As a result of this difference in coloring agent concentration on the outer surface of the colored speckle, the colored speckles of the present invention may exhibit lighter shades of color (e.g. lighter blues shades) when compared with a colored speckle having color present only on its exterior surface (e.g. darker blue shades). It may unexpected that such lighter shades of color would provide enough aesthetically pleasing color to a detergent composition to which it may be added, or that these colored speckles would provide enough coloring agent to adequately color the wash water of a detergent-containing solution, or that these colored speckles would release enough bluing/hueing agent (color) into the wash water so as to deposit on fabric and provide a whiteness perception benefit.

Laundry Care Compositions

The colored speckles described in the present specification may be incorporated into a laundry care composition including but not limited to laundry detergents and fabric care compositions. Such compositions comprise one or more of the colored speckles and a laundry care ingredient.

The laundry care compositions including laundry detergents may be in solid or liquid form, including a gel form. The solid form of the laundry care compositions include, for example, compositions comprised of granules, powder, or flakes. For instance, the colored speckles of the present invention may be added to powdered laundry detergent compositions.

The colored speckles may be present in a laundry detergent composition in an amount from about 0.0001% to about 20% by weight of the composition, from about 0.0001% to about 10% by weight of the composition, and even from about 0.0001% to about 5% by weight of the composition.

The laundry detergent composition typically comprises a surfactant in an amount sufficient to provide desired cleaning properties. In one embodiment, the laundry detergent composition comprises, by weight, from about 5% to about 90% of the surfactant, and more specifically from about 5% to about 70% of the surfactant, and even more specifically from about 5% to about 40%. The surfactant may comprise anionic, nonionic, cationic, zwitterionic and/or amphoteric surfactants. In a more specific embodiment, the detergent composition comprises anionic surfactant, nonionic surfactant, or mixtures thereof.

Fabric care compositions are typically added in the rinse cycle, which is after the detergent solution has been used and replaced with the rinsing solution in typical laundering processes. The fabric care compositions disclosed herein may be comprise a rinse added fabric softening active and one or more colored speckles as disclosed in the present specification. The fabric care composition may comprise, based on total fabric care composition weight, from about 1% to about 90%, or from about 5% to about 50% fabric softening active. The colored speckles may be present in the fabric care composition in an amount from about 0.5 ppb to about 50 ppm, or from about 0.5 ppm to about 30 ppm.

Suitable Laundry Care Ingredients

While not essential for the purposes of the present invention, the non-limiting list of laundry care ingredients illustrated hereinafter are suitable for use in the laundry care compositions and may be desirably incorporated in certain aspects of the invention, for example to assist or enhance performance, for treatment of the substrate to be cleaned, or to modify the aesthetics of the composition as is the case with perfumes, colorants, dyes or the like. It is understood that such ingredients are in addition to the components that were previously listed for any particular aspect. The total amount of such adjuncts may range, once the amount of dye is taken into consideration from about 90% to about 99.99999995% by weight of the laundry care composition.

The precise nature of these additional components, and levels of incorporation thereof, will depend on the physical form of the composition and the nature of the operation for which it is to be used. Suitable laundry care ingredients include, but are not limited to, fabric softening actives, polymers, for example cationic polymers, surfactants, builders, chelating agents, dye transfer inhibiting agents, dispersants, enzymes, and enzyme stabilizers, catalytic materials, bleach activators, polymeric dispersing agents, clay soil removal/anti-redeposition agents, brighteners, suds suppressors, dyes, additional perfume and perfume delivery systems, structure elasticizing agents, fabric softeners, carriers, hydrotropes, processing aids and/or pigments. In addition to the disclosure below, suitable examples of such other adjuncts and levels of use are found in U.S. Pat. Nos. 5,576,282, 6,306,812 B1 and 6,326,348 B1 that are incorporated by reference.

As stated, the laundry care ingredients are not essential to Applicants' laundry care compositions. Thus, certain aspects of Applicants' compositions do not contain one or more of the following adjuncts materials: fabric softening actives, bleach activators, surfactants, builders, chelating agents, dye transfer inhibiting agents, dispersants, enzymes, and enzyme stabilizers, catalytic metal complexes, polymeric dispersing agents, clay and soil removal/anti-redeposition agents, brighteners, suds suppressors, dyes, additional perfumes and perfume delivery systems, structure elasticizing agents, fabric softeners, carriers, hydrotropes, processing aids and/or pigments. However, when one or more adjuncts are present, such one or more adjuncts may be present as detailed below:

Surfactants

Suitable anionic surfactants useful herein can comprise any of the conventional anionic surfactant types typically used in liquid detergent products. These include the alkyl benzene sulfonic acids and their salts as well as alkoxylated or non-alkoxylated alkyl sulfate materials.

Exemplary anionic surfactants are the alkali metal salts of $C_{10}$-$C_{16}$ alkyl benzene sulfonic acids, or $C_{11}$-$C_{14}$ alkyl benzene sulfonic acids. In one aspect, the alkyl group is linear and such linear alkyl benzene sulfonates are known as "LAS". Alkyl benzene sulfonates, and particularly LAS, are well known in the art. Such surfactants and their preparation are described for example in U.S. Pat. Nos. 2,220,099 and 2,477,383. Especially useful are the sodium and potassium linear straight chain alkylbenzene sulfonates in which the average number of carbon atoms in the alkyl group is from about 11 to 14. Sodium $C_{11}$-$C_{14}$, e.g., $C_{12}$, LAS is a specific example of such surfactants.

Another exemplary type of anionic surfactant comprises ethoxylated alkyl sulfate surfactants. Such materials, also known as alkyl ether sulfates or alkyl polyethoxylate sulfates, are those which correspond to the formula: R'—O—$(C_2H_4O)_n$—$SO_3M$ wherein R' is a $C_8$-$C_{20}$ alkyl group, n is from about 1 to 20, and M is a salt-forming cation. In one aspect, R' is $C_{10}$-$C_{18}$ alkyl, n is from about 1 to 15, and M is sodium, potassium, ammonium, alkylammonium, or alkanolammonium. In one aspect, R' is a $C_{12}$-$C_{16}$, n is from about 1 to 6 and M is sodium.

The alkyl ether sulfates will generally be used in the form of mixtures comprising varying R' chain lengths and varying degrees of ethoxylation. Frequently such mixtures will inevitably also contain some non-ethoxylated alkyl sulfate materials, i.e., surfactants of the above ethoxylated alkyl sulfate formula wherein n=0. Non-ethoxylated alkyl sulfates may also be added separately to the compositions of this invention and used as or in any anionic surfactant component which may be present. Specific examples of non-alkoxylated, e.g., non-ethoxylated, alkyl ether sulfate surfactants are those produced by the sulfation of higher $C_8$-$C_{20}$ fatty alcohols. Conventional primary alkyl sulfate surfactants have the general formula: $ROSO_3$-$M^+$ wherein R is typically a linear $C_8$-$C_{20}$ hydrocarbyl group, which may be straight chain or branched chain, and M is a water-solubilizing cation. In one aspect, R is a $C_{10}$-$C_{15}$ alkyl, and M is alkali metal, more specifically R is $C_{12}$-$C_{14}$ and M is sodium.

Specific, non-limiting examples of anionic surfactants useful herein include: a) $C_{11}$-$C_{18}$ alkyl benzene sulfonates (LAS); b) $C_{10}$-$C_{20}$ primary, branched-chain and random alkyl sulfates (AS); c) $C_{10}$-$C_{18}$ secondary (2,3) alkyl sulfates having formulae (I) and (II): wherein M in formulae (I) and (II) is hydrogen or a cation which provides charge neutrality, and all M units, whether associated with a surfactant or adjunct ingredient, can either be a hydrogen atom or a cation depending upon the form isolated by the artisan or the relative pH of the system wherein the compound is used, with non-limiting examples of suitable cations including sodium, potassium, ammonium, and mixtures thereof, and x is an integer of at least about 7, or at least about 9, and y is an integer of at least 8, or at least about 9; d) $C_{10}$-$C_{18}$ alkyl alkoxy sulfates ($AE_xS$) wherein x is from 1-30; e) $C_{10}$-$C_{18}$ alkyl alkoxy carboxylates in one aspect, comprising 1-5 ethoxy units; f) mid-chain branched alkyl sulfates as discussed in U.S. Pat. Nos. 6,020, 303 and 6,060,443; g) mid-chain branched alkyl alkoxy sulfates as discussed in U.S. Pat. Nos. 6,008,181 and 6,020,303; h) modified alkylbenzene sulfonate (MLAS) as discussed in WO 99/05243, WO 99/05242, WO 99/05244, WO 99/05082, WO 99/05084, WO 99/05241, WO 99/07656, WO 00/23549, and WO 00/23548; i) methyl ester sulfonate (MES); and j) alpha-olefin sulfonate (AOS).

Suitable nonionic surfactants useful herein can comprise any of the conventional nonionic surfactant types typically used in liquid detergent products. These include alkoxylated fatty alcohols and amine oxide surfactants. In one aspect, for use in the liquid detergent products herein are those nonionic surfactants which are normally liquid.

Suitable nonionic surfactants for use herein include the alcohol alkoxylate nonionic surfactants. Alcohol alkoxylates are materials which correspond to the general formula: $R^1(C_mH_{2m}O)_nOH$ wherein $R^1$ is a $C_8$-$C_{16}$ alkyl group, m is from 2 to 4, and n ranges from about 2 to 12. In one aspect, $R^1$ is an alkyl group, which may be primary or secondary, that comprises from about 9 to 15 carbon atoms, or from about 10 to 14 carbon atoms. In one aspect, the alkoxylated fatty alcohols will also be ethoxylated materials that contain from about 2 to 12 ethylene oxide moieties per molecule, or from about 3 to 10 ethylene oxide moieties per molecule.

The alkoxylated fatty alcohol materials useful in the liquid detergent compositions herein will frequently have a hydrophilic-lipophilic balance (HLB) which ranges from about 3 to 17 from about 6 to 15, or from about 8 to 15. Alkoxylated fatty alcohol nonionic surfactants have been marketed under the tradenames Neodol and Dobanol by the Shell Chemical Company.

Another suitable type of nonionic surfactant useful herein comprises the amine oxide surfactants. Amine oxides are materials which are often referred to in the art as "semi-polar" nonionics. Amine oxides have the formula: $R(EO)_x(PO)_y(BO)_zN(O)(CH_2R')_2.qH_2O$. In this formula, R is a relatively long-chain hydrocarbyl moiety which can be saturated or unsaturated, linear or branched, and can contain from 8 to 20, 10 to 16 carbon atoms, or is a $C_{12}$-$C_{16}$ primary alkyl. R' is a short-chain moiety, in one aspect R' may be selected from hydrogen, methyl and —$CH_2OH$. When x+y+z is different from 0, EO is ethyleneoxy, PO is propyleneoxy and BO is butyleneoxy. Amine oxide surfactants are illustrated by $C_{12-14}$ alkyldimethyl amine oxide.

Non-limiting examples of nonionic surfactants include: a) $C_{12}$-$C_{18}$ alkyl ethoxylates, such as, NEODOL® nonionic surfactants from Shell; b) $C_6$-$C_{12}$ alkyl phenol alkoxylates wherein the alkoxylate units are a mixture of ethyleneoxy and propyleneoxy units; c) $C_{12}$-$C_{18}$ alcohol and $C_6$-$C_{12}$ alkyl phenol condensates with ethylene oxide/propylene oxide block polymers such as Pluronic® from BASF; d) $C_{14}$-$C_{22}$ mid-chain branched alcohols, BA, as discussed in U.S. Pat. No. 6,150,322; e) $C_{14}$-$C_{22}$ mid-chain branched alkyl alkoxylates, $BAE_R$, wherein x if from 1-30, as discussed in U.S. Pat. Nos. 6,153,577, 6,020,303 and 6,093,856; f) Alkylpolysaccharides as discussed in U.S. Pat. No. 4,565,647 to Llenado, issued Jan. 26, 1986; specifically alkylpolyglycosides as discussed in U.S. Pat. Nos. 4,483,780 and 4,483,779; g) Polyhydroxy fatty acid amides as discussed in U.S. Pat. No. 5,332,528, WO 92/06162, WO 93/19146, WO 93/19038, and WO 94/09099; and h) ether capped poly(oxyalkylated) alcohol surfactants as discussed in U.S. Pat. No. 6,482,994 and WO 01/42408.

In the laundry detergent compositions herein, the detersive surfactant component may comprise combinations of anionic and nonionic surfactant materials. When this is the case, the weight ratio of anionic to nonionic will typically range from 10:90 to 90:10, more typically from 30:70 to 70:30.

Cationic surfactants are well known in the art and non-limiting examples of these include quaternary ammonium surfactants, which can have up to 26 carbon atoms. Additional examples include a) alkoxylate quaternary ammonium (AQA) surfactants as discussed in U.S. Pat. No. 6,136,769; b) dimethyl hydroxyethyl quaternary ammonium as discussed in U.S. Pat. No. 6,004,922; c) polyamine cationic surfactants as discussed in WO 98/35002, WO 98/35003, WO 98/35004, WO 98/35005, and WO 98/35006; d) cationic ester surfactants as discussed in U.S. Pat. Nos. 4,228,042, 4,239,660 4,260,529 and 6,022,844; and e) amino surfactants as discussed in U.S. Pat. No. 6,221,825 and WO 00/47708, specifically amido propyldimethyl amine (APA).

Non-limiting examples of zwitterionic surfactants include derivatives of secondary and tertiary amines, derivatives of heterocyclic secondary and tertiary amines, or derivatives of quaternary ammonium, quaternary phosphonium or tertiary sulfonium compounds. See U.S. Pat. No. 3,929,678 to Laughlin et al., issued Dec. 30, 1975 at column 19, line 38 through column 22, line 48, for examples of zwitterionic surfactants; betaine, including alkyl dimethyl betaine and cocodimethyl amidopropyl betaine, $C_8$ to $C_{18}$ (in one aspect $C_{12}$ to $C_{18}$) amine oxides and sulfo and hydroxy betaines, such as N-alkyl-N,N-dimethylammino-1-propane sulfonate where the alkyl group can be $C_8$ to $C_{18}$, or $C_{10}$ to $C_{14}$.

Non-limiting examples of ampholytic surfactants include aliphatic derivatives of secondary or tertiary amines, or aliphatic derivatives of heterocyclic secondary and tertiary amines in to which the aliphatic radical can be straight- or branched-chain. One of the aliphatic substituents comprises at least about 8 carbon atoms, typically from about 8 to about 18 carbon atoms, and at least one comprises an anionic water-solubilizing group, e.g. carboxy, sulfonate, sulfate. See U.S. Pat. No. 3,929,678 to Laughlin et al., issued Dec. 30, 1975 at column 19, lines 18-35, for examples of ampholytic surfactants.

Aqueous, Non-surface Active Liquid Carrier

As noted, the laundry care compositions may be in the form of a solid, either in tablet or particulate form, including, but not limited to particles, flakes, sheets, or the like, or the compositions may be in the form of a liquid. The liquid detergent compositions may comprise an aqueous, non-surface active liquid carrier. Generally, the amount of the aqueous, non-surface active liquid carrier employed in the compositions herein will be effective to solubilize, suspend or disperse the composition components. For example, the liquid detergent compositions may comprise, based on total liquid detergent composition weight, from about 5% to about 90%, from about 10% to about 70%, or from about 20% to about 70% of the aqueous, non-surface active liquid carrier.

The most cost effective type of aqueous, non-surface active liquid carrier is typically water. Accordingly, the aqueous, non-surface active liquid carrier component will generally be mostly, if not completely, comprised of water. While other types of water-miscible liquids, such alkanols, diols, other polyols, ethers, amines, and the like, have been conventionally been added to liquid detergent compositions as co-solvents or stabilizers, for purposes of the present invention, the utilization of such water-miscible liquids typically is minimized to hold down composition cost. Accordingly, the aqueous liquid carrier component of the liquid detergent products herein will generally comprise water present in concentrations ranging from about 5% to about 90%, or from about 5% to about 70%, by weight of the liquid detergent composition.

Bleaching Agents

Bleaching Agents—The laundry care compositions of the present invention may comprise one or more bleaching agents. Suitable bleaching agents other than bleaching catalysts include photobleaches, bleach activators, hydrogen peroxide, sources of hydrogen peroxide, preformed peracids and mixtures thereof. In general, when a bleaching agent is used, the compositions of the present invention may comprise from about 0.1% to about 50% or even from about 0.1% to about 25% bleaching agent by weight of the subject laundry care composition. Examples of suitable bleaching agents include:

(1) photobleaches for example sulfonated zinc phthalocyanine;

(2) preformed peracids: Suitable preformed peracids include, but are not limited to, compounds selected from the group consisting of percarboxylic acids and salts, percarbonic acids and salts, perimidic acids and salts, peroxymonosulfuric acids and salts, for example, Oxzone®, and mixtures thereof. Suitable percarboxylic acids include hydrophobic and hydrophilic peracids having the formula R—(C=O)O—O-M wherein R is an alkyl group, optionally branched, having, when the peracid is hydrophobic, from 6 to 14 carbon atoms, or from 8 to 12 carbon atoms and, when the peracid is hydrophilic, less than 6 carbon atoms or even less than 4 carbon atoms; and M is a counterion, for example, sodium, potassium or hydrogen;

(3) sources of hydrogen peroxide, for example, inorganic perhydrate salts, including alkali metal salts such as sodium salts of perborate (usually mono- or tetra-hydrate), percarbonate, persulphate, perphosphate, persilicate salts and mixtures thereof. In one aspect of the invention the inorganic perhydrate salts are selected from the group consisting of sodium salts of perborate, percarbonate and mixtures thereof. When employed, inorganic perhydrate salts are typically present in amounts of from 0.05 to 40 wt %, or 1 to 30 wt % of the overall composition and are typically incorporated into such compositions as a crystalline solid that may be coated. Suitable coatings include, inorganic salts such as alkali metal silicate, carbonate or borate salts or mixtures thereof, or organic materials such as water-soluble or dispersible polymers, waxes, oils or fatty soaps; and (4) bleach activators having R—(C=O)-L wherein R is an alkyl group, optionally branched, having, when the bleach activator is hydrophobic, from 6 to 14 carbon atoms, or from 8 to 12 carbon atoms and, when the bleach activator is hydrophilic, less than 6 carbon atoms or even less than 4 carbon atoms; and L is leaving group. Examples of suitable leaving groups are benzoic acid and derivatives thereof—especially benzene sulphonate. Suitable bleach activators include dodecanoyl oxybenzene sulphonate, decanoyl oxybenzene sulphonate, decanoyl oxybenzoic acid or salts thereof, 3,5,5-trimethyl hexanoyloxybenzene sulphonate, tetraacetyl ethylene diamine (TAED) and nonanoyloxybenzene sulphonate (NOBS). Suitable bleach activators are also disclosed in WO 98/17767. While any suitable bleach activator may be employed, in one aspect of the invention the subject cleaning composition may comprise NOBS, TAED or mixtures thereof.

When present, the peracid and/or bleach activator is generally present in the composition in an amount of from about 0.1 to about 60 wt %, from about 0.5 to about 40 wt % or even from about 0.6 to about 10 wt % based on the composition. One or more hydrophobic peracids or precursors thereof may be used in combination with one or more hydrophilic peracid or precursor thereof.

The amounts of hydrogen peroxide source and peracid or bleach activator may be selected such that the molar ratio of available oxygen (from the peroxide source) to peracid is from 1:1 to 35:1, or even 2:1 to 10:1.

Bleach Boosting Compounds—The compositions herein may comprise one or more bleach boosting compounds. Bleach boosting compounds provide increased bleaching effectiveness in lower temperature applications. The bleach boosters act in conjunction with conventional peroxygen bleaching sources to provide increased bleaching effectiveness. This is normally accomplished through in situ formation of an active oxygen transfer agent such as a dioxirane, an oxaziridine, or an oxaziridinium. Alternatively, preformed dioxiranes, oxaziridines and oxaziridiniums may be used.

Among suitable bleach boosting compounds for use in accordance with the present invention are cationic imines, zwitterionic imines, anionic imines and/or polyionic imines having a net charge of from about +3 to about −3, and mixtures thereof. These imine bleach boosting compounds of the present invention include those of the general structure:

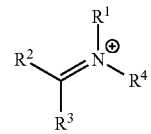

[I]

where $R^1$-$R^4$ may be a hydrogen or an unsubstituted or substituted radical selected from the group consisting of phenyl, aryl, heterocyclic ring, alkyl and cycloalkyl radicals.

Suitable bleach boosting compounds include zwitterionic bleach boosters zwitterionic bleach boosters, which are described in U.S. Pat. Nos. 5,576,282 and 5,718,614. Other bleach boosting compounds include cationic bleach boosters described in U.S. Pat. Nos. 5,360,569; 5,442,066; 5,478,357; 5,370,826; 5,482,515; 5,550,256; and WO 95/13351, WO 95/13352, and WO 95/13353.

Peroxygen sources are well-known in the art and the peroxygen source employed in the present invention may comprise any of these well known sources, including peroxygen compounds as well as compounds, which under consumer use conditions, provide an effective amount of peroxygen in situ. The peroxygen source may include a hydrogen peroxide source, the in situ formation of a peracid anion through the reaction of a hydrogen peroxide source and a bleach activator, preformed peracid compounds or mixtures of suitable peroxygen sources. Of course, one of ordinary skill in the art will recognize that other sources of peroxygen may be employed without departing from the scope of the invention. The bleach boosting compounds, when present, are typically employed in conjunction with a peroxygen source in the bleaching systems of the present invention.

Enzyme Bleaching—Enzymatic systems may be used as bleaching agents. The hydrogen peroxide may also be present by adding an enzymatic system (i.e. an enzyme and a substrate therefore) which is capable of generating hydrogen peroxide at the beginning or during the washing and/or rinsing process. Such enzymatic systems are disclosed in EP Patent Application 91202655.6 filed Oct. 9, 1991.

The present invention compositions and methods may utilize alternative bleach systems such as ozone, chlorine dioxide and the like. Bleaching with ozone may be accomplished by introducing ozone-containing gas having ozone content from about 20 to about 300 g/m³ into the solution that is to contact the fabrics. The gas:liquid ratio in the solution should be maintained from about 1:2.5 to about 1:6. U.S. Pat. No. 5,346,588 describes a process for the utilization of ozone as an alternative to conventional bleach systems and is herein incorporated by reference.

In one aspect, the fabric softening active ("FSA") is a quaternary ammonium compound suitable for softening fabric in a rinse step. In one aspect, the FSA is formed from a reaction product of a fatty acid and an aminoalcohol obtaining mixtures of mono-, di-, and, in one aspect, triester compounds. In another aspect, the FSA comprises one or more softener quaternary ammonium compounds such, but not limited to, as a monoalkyquaternary ammonium compound, a diamido quaternary compound and a diester quaternary ammonium compound, or a combination thereof.

In one aspect of the invention, the FSA comprises a diester quaternary ammonium (hereinafter "DQA") compound composition. In certain aspects of the present invention, the DQA compounds compositions also encompasses a description of diamido FSAs and FSAs with mixed amido and ester linkages as well as the aforementioned diester linkages, all herein referred to as DQA.

A first type of DQA ("DQA (1)") suitable as a FSA in the present CFSC includes a compound comprising the formula:

wherein each R substituent is either hydrogen, a short chain $C_1$-$C_6$, for example $C_1$-$C_3$ alkyl or hydroxyalkyl group, e.g., methyl, ethyl, propyl, hydroxyethyl, and the like, poly ($C_{2-3}$ alkoxy), for example. polyethoxy, group, benzyl, or mixtures thereof; each m is 2 or 3; each n is from 1 to about 4, or 2; each Y is —O(O)C—, —C(O)—O—, —NR—C(O)—, or —C(O)—NR— and it is acceptable for each Y to be the same or different; the sum of carbons in each $R^1$, plus one when Y is —O—(O)C— or —NR—C(O)—, is $C_{12}$-$C_{22}$, or $C_{14}$-$C_{20}$, with each $R^1$ being a hydrocarbyl, or substituted hydrocarbyl group; it is acceptable for $R^1$ to be unsaturated or saturated and branched or linear and in one aspect it is linear; it is acceptable for each $R^1$ to be the same or different and typically these are the same; and $X^-$ can be any softener-compatible anion, suitable anions include, chloride, bromide, methylsulfate, ethylsulfate, sulfate, phosphate, and nitrate, in one aspect the anions are chloride or methyl sulfate. Suitable DQA compounds are typically made by reacting alkanolamines such as MDEA (methyldiethanolamine) and TEA (triethanolamine) with fatty acids. Some materials that typically result from such reactions include N,N-di(acyl-oxyethyl)-N,N-dimethylammonium chloride or N,N-di(acyl-oxyethyl)-N,N-methylhydroxyethylammonium methylsulfate wherein the acyl group is derived from animal fats, unsaturated, and polyunsaturated, fatty acids, e.g., tallow, hardended tallow, oleic acid, and/or partially hydrogenated fatty acids, derived from vegetable oils and/or partially hydrogenated vegetable oils, such as, canola oil, safflower oil, peanut oil, sunflower oil, corn oil, soybean oil, tall oil, rice bran oil, palm oil, etc.

Non-limiting examples of suitable fatty acids are listed in U.S. Pat. No. 5,759,990 at column 4, lines 45-66. In one aspect, the FSA comprises other actives in addition to DQA (1) or DQA. In yet another aspect, the FSA comprises only DQA (1) or DQA and is free or essentially free of any other quaternary ammonium compounds or other actives. In yet another aspect, the FSA comprises the precursor amine that is used to produce the DQA. In another aspect of the invention, the FSA comprises a compound, identified as DTTMAC comprising the formula:

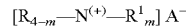

wherein each m is 2 or 3, each $R^1$ is a $C_6$-$C_{22}$, or $C_{14}$-$C_{20}$, but no more than one being less than about $C_{12}$ and then the other is at least about 16, hydrocarbyl, or substituted hydrocarbyl substituent, for example, $C_{10}$-$C_{20}$ alkyl or alkenyl (unsaturated alkyl, including polyunsaturated alkyl, also referred to sometimes as "alkylene"), in one aspect $C_{12}$-$C_{18}$ alkyl or alkenyl, and branch or unbranched. In one aspect, the Iodine Value (IV) of the FSA is from about 1 to 70; each R is H or a short chain $C_1$-$C_6$, or $C_1$-$C_3$ alkyl or hydroxyalkyl group, e.g., methyl, ethyl, propyl, hydroxyethyl, and the like, benzyl, or $(R^{20})_{2-4}H$ where each $R^2$ is a $C_{1-6}$ alkylene group; and $A^-$ is a softener compatible anion, suitable anions include chloride, bromide, methylsulfate, ethylsulfate, sulfate, phosphate, or nitrate; in one aspect the anions are chloride or methyl sulfate.

Examples of these FSAs include dialkydimethylammonium salts and dialkylenedimethylammonium salts such as ditallowedimethylammonium and ditallowedimethylammonium methylsulfate. Examples of commercially available dialkylenedimethylammonium salts usable in the present invention are di-hydrogenated tallow dimethyl ammonium chloride and ditallowedimethyl ammonium chloride available from Degussa under the trade names Adogen® 442 and Adogen® 470 respectively. In one aspect, the FSA comprises other actives in addition to DTTMAC. In yet another aspect, the FSA comprises only compounds of the DTTMAC and is free or essentially free of any other quaternary ammonium compounds or other actives.

In one aspect, the FSA comprises an FSA described in U.S. Pat. Pub. No. 2004/0204337 A1, published Oct. 14, 2004 to Corona et al., from paragraphs 30-79. In another aspect, the FSA is one described in U.S. Pat. Pub. No. 2004/0229769 A1, published Nov. 18, 2005, to Smith et al., on paragraphs 26-31; or U.S. Pat. No. 6,494,920, at column 1, line 51 et seq. detailing an "esterquat" or a quaternized fatty acid triethanolamine ester salt.

In one aspect, the FSA is chosen from at least one of the following: ditallowoyloxyethyl dimethyl ammonium chloride, dihydrogenated-tallowoyloxyethyl dimethyl ammonium chloride, ditallow dimethyl ammonium chloride, ditallowoyloxyethyl dimethyl ammonium methyl sulfate, dihydrogenated-tallowoyloxyethyl dimethyl ammonium chloride, dihydrogenated-tallowoyloxyethyl dimethyl ammonium chloride, or combinations thereof.

In one aspect, the FSA may also include amide containing compound compositions. Examples of diamide comprising compounds may include but not limited to methyl-bis(tallowam idoethyl)-2-hydroxyethylammonium methyl sulfate (available from Degussa under the trade names Varisoft 110 and Varisoft 222). An example of an amide-ester containing compound is N-[3-(stearoylamino)propyl]-N-[2-(stearoyloxy)ethoxy)ethyl)]-N-methylamine.

Another aspect of the invention provides for a rinse added fabric softening composition further comprising a cationic starch. Cationic starches are disclosed in US 2004/0204337 A1. In one aspect, the rinse added fabric softening composition comprises from about 0.1% to about 7% of cationic starch by weight of the fabric softening composition. In one aspect, the cationic starch is HCP401 from National Starch.

Builders—The compositions of the present invention can comprise one or more detergent builders or builder systems. When present, the compositions will typically comprise at least about 1% builder, or from about 5% or 10% to about 80%, 50%, or even 30% by weight, of said builder. Builders include, but are not limited to, the alkali metal, ammonium and alkanolammonium salts of polyphosphates, alkali metal silicates, alkaline earth and alkali metal carbonates, aluminosilicate builders polycarboxylate compounds. ether hydroxypolycarboxylates, copolymers of maleic anhydride with ethylene or vinyl methyl ether, 1,3,5-trihydroxybenzene-2,4,6-trisulphonic acid, and carboxymethyl-oxysuccinic acid, the various alkali metal, ammonium and substituted ammonium salts of polyacetic acids such as ethylenediamine tetraacetic acid and nitrilotriacetic acid, as well as polycarboxylates such as mellitic acid, succinic acid, oxydisuccinic acid, polymaleic acid, benzene 1,3,5-tricarboxylic acid, carboxymethyloxysuccinic acid, and soluble salts thereof.

Chelating Agents—The compositions herein may also optionally contain one or more copper, iron and/or manganese chelating agents. If utilized, chelating agents will generally comprise from about 0.1% by weight of the compositions herein to about 15%, or even from about 3.0% to about 15% by weight of the compositions herein.

Dye Transfer Inhibiting Agents—The compositions of the present invention may also include one or more dye transfer inhibiting agents. Suitable polymeric dye transfer inhibiting agents include, but are not limited to, polyvinylpyrrolidone polymers, polyamine N-oxide polymers, copolymers of N-vinylpyrrolidone and N-vinylimidazole, polyvinyloxazolidones and polyvinylimidazoles or mixtures thereof. When present in the compositions herein, the dye transfer inhibiting agents are present at levels from about 0.0001%, from about 0.01%, from about 0.05% by weight of the cleaning compositions to about 10%, about 2%, or even about 1% by weight of the cleaning compositions.

Dispersants—The compositions of the present invention can also contain dispersants. Suitable water-soluble organic materials are the homo- or co-polymeric acids or their salts, in which the polycarboxylic acid may comprise at least two carboxyl radicals separated from each other by not more than two carbon atoms.

Enzymes—The compositions can comprise one or more detergent enzymes which provide cleaning performance and/or fabric care benefits. Examples of suitable enzymes include, but are not limited to, hemicellulases, peroxidases, proteases, cellulases, xylanases, lipases, phospholipases, esterases, cutinases, pectinases, keratanases, reductases, oxidases, phenoloxidases, lipoxygenases, ligninases, pullulanases, tannases, pentosanases, malanases, β-glucanases, arabinosidases, hyaluronidase, chondroitinase, laccase, and amylases, or mixtures thereof. A typical combination is a cocktail of conventional applicable enzymes like protease, lipase, cutinase and/or cellulase in conjunction with amylase.

Enzyme Stabilizers—Enzymes for use in compositions, for example, detergents can be stabilized by various techniques. The enzymes employed herein can be stabilized by the presence of water-soluble sources of calcium and/or magnesium ions in the finished compositions that provide such ions to the enzymes.

Process of Making

The liquid detergent compositions are in the form of an aqueous solution or uniform dispersion or suspension of surfactant, colored speckles, and certain optional other ingredients, some of which may normally be in solid form, that have been combined with the normally liquid components of the composition, such as the liquid alcohol ethoxylate nonionic, the aqueous liquid carrier, and any other normally liquid optional ingredients. Such a solution, dispersion or suspension will be acceptably phase stable and will typically have a viscosity which ranges from about 100 to 600 cps, or from about 150 to 400 cps. For purposes of this invention, viscosity is measured with a Brookfield LVDV-II+ viscometer apparatus using a #21 spindle.

The liquid detergent compositions herein can be prepared by combining the components thereof in any convenient order and by mixing, e.g., agitating, the resulting component combination to form a phase stable liquid detergent composition. In a process for preparing such compositions, a liquid matrix is formed containing at least a major proportion, or even substantially all, of the liquid components, e.g., non-ionic surfactant, the non-surface active liquid carriers and other optional liquid components, with the liquid components being thoroughly admixed by imparting shear agitation to this liquid combination. For example, rapid stirring with a mechanical stirrer may usefully be employed. While shear agitation is maintained, substantially all of any anionic surfactants and the solid form ingredients can be added. Agitation of the mixture is continued, and if necessary, can be increased at this point to form a solution or a uniform dispersion of insoluble solid phase particulates within the liquid phase. After some or all of the solid-form materials have been added to this agitated mixture, particles of any enzyme material to be included, e.g., enzyme prills, are incorporated. As a variation of the composition preparation procedure hereinbefore described, one or more of the solid components may be added to the agitated mixture as a solution or slurry of particles premixed with a minor portion of one or more of the liquid components. After addition of all of the composition components, agitation of the mixture is continued for a period of time sufficient to form compositions having the requisite viscosity and phase stability characteristics. Frequently this will involve agitation for a period of from about 30 to 60 minutes.

In one aspect of forming the liquid detergent compositions, the colored speckles are first combined with one or more liquid components to form a colored speckle premix, and this premix is added to a composition formulation containing a substantial portion, for example more than 50% by weight, more specifically, more than 70% by weight, and yet more specifically, more than 90% by weight, of the balance of components of the laundry detergent composition. For example, in the methodology described above, both the colored speckle premix and the enzyme component are added at a final stage of component additions. In another aspect, the colored speckles are encapsulated prior to addition to the detergent composition, the encapsulated speckles are suspended in a structured liquid, and the suspension is added to a composition formulation containing a substantial portion of the balance of components of the laundry detergent composition.

As noted previously, the detergent compositions may be in a solid form. Suitable solid forms include tablets and particulate forms, for example, granular particles, flakes or sheets. Various techniques for forming detergent compositions in such solid forms are well known in the art and may be used herein. In one aspect, for example when the detergent composition is in the form of a granular particle, the colored speckles are provided in particulate form, optionally including additional but not all components of the laundry detergent composition. The colored speckles are combined with one or more additional particulates containing a balance of components of the laundry detergent composition. Further, the colored speckles, optionally including additional but not all components of the laundry detergent composition, may be provided in an encapsulated form, and the colored speckle encapsulate is combined with particulates containing a substantial balance of components of the laundry detergent composition.

The compositions of this invention, prepared as hereinbefore described, can be used to form aqueous washing solutions for use in the laundering of fabrics. Generally, an effective amount of such compositions is added to water, for example in a conventional fabric laundering automatic washing machine, to form such aqueous laundering solutions. The aqueous washing solution so formed is then contacted, typically under agitation, with the fabrics to be laundered therewith. An effective amount of the liquid detergent compositions to herein added to water to form aqueous laundering solutions can comprise amounts sufficient to form from about 500 to 7,000 ppm of composition in aqueous washing solution, or from about 1,000 to 3,000 ppm of the detergent compositions herein will be provided in aqueous washing solution.

Method of Use

Certain of the consumer products disclosed herein can be used to clean or treat a situs inter alia a surface or fabric. Typically at least a portion of the situs is contacted with an embodiment of Applicants' consumer product, in neat form or diluted in a liquor, for example, a wash liquor and then the situs may be optionally washed and/or rinsed. In one aspect, a situs is optionally washed and/or rinsed, contacted with an aspect of the consumer product and then optionally washed and/or rinsed. For purposes of the present invention, washing includes but is not limited to, scrubbing, and mechanical agitation. The fabric may comprise most any fabric capable of being laundered or treated in normal consumer use conditions. Liquors that may comprise the disclosed compositions may have a pH of from about 3 to about 11.5. Such compositions are typically employed at concentrations of from about 500 ppm to about 15,000 ppm in solution. When the wash solvent is water, the water temperature typically ranges from about 5° C. to about 90° C. and, when the situs comprises a fabric, the water to fabric ratio is typically from about 1:1 to about 30:1. Employing one or more of the aforementioned methods results in a treated situs.

EXAMPLES

The invention may be further understood by reference to the following examples which are not to be construed as limiting the scope of the present invention. The indication of "N/A" is used when no data or no additional data is available.

The following examples were prepared to illustrate that, at equal color loadings and particle size, colored speckles prepared according to the methods of the present invention consistently provided better bleed protection when tested in granular detergent compositions.

A. Preparation of Colored Speckles

The following procedures were used to prepare colored speckles:

Colored Speckle Preparation (Method A)

1. 50 g of ungranulated sodium carbonate powder (Light E Grade from Brunner Mond) was added to a small food processor.
2. The desired amount of coloring agent was added to a small beaker and diluted with water, as indicated in Table 1. This colored aqueous solution was then dripped into the food processor and blended into the powder. After all of the colored aqueous solution was added and blended, the colored powder was spread out onto a piece of foil overnight to dry.
3. The colored powder was then compacted in a tablet press. Two 10 g tablets were made using 10,000 pounds of pressure for about 5 seconds.
4. The tablets were then broken into big chunks with a hammer. The big chunks were put back into the small food processor and chopped into smaller pieces. The colored speckles thus produced were then sifted through #14 and #25 sieves. The speckles that would not go through the #25 were kept.
5. These colored speckles are provided as Examples 1 through 10 in Table 1A.

TABLE 1A

Colored speckles made according to Method A.

| Sample | Coloring Agent | % Wt. | Color Value | Amount of Coloring Agent (g) | Amount of Water (g) | Amount of Sodium Carbonate (g) |
|---|---|---|---|---|---|---|
| Example 1 | Violet DD$^a$ (PP012) | 3 | 4.5 | 1.61 | 2 | 50 |
| Example 2 | Direct Violet 9$^b$ | 3.6 | 3.75 | 1.932 | 2 | 50 |
| Example 3 | Acid Blue 80$^c$ (01001) | 0.716 | 19.32 | 0.375 | 7 | 50 |
| Example 4 | Acid Red 52$^d$ | 0.163 | 85.31 | 0.085 | 2 | 50 |
| Example 5 | Ultramarine Blue$^e$ | 0.952 | NA | 0.5 | 2 | 50 |
| Example 6 | Blue SE$^a$ | 0.952 | 14.5 | 0.5 | 2 | 50 |
| Example 7 | Direct Blue 86$^f$ | 0.24 | 58.22 | 0.125 | 2 | 50 |
| Example 8 | Pigment Blue 15 | 0.952 | NA | 0.5 | 2 | 50 |
| Example 9 | Chromatint Yellow X-2407$^g$ | 0.952 | NA | 0.5 | 2 | 50 |
| Example 10 | PhotoBleach | 0.952 | NA | 0.5 | 2 | 50 |

$^a$Liquitint ® polymeric colorant, available from Milliken & Company of Spartanburg, SC.
$^b$A direct dye, available from Ciba.
$^c$An acid dye, available from Aceto.
$^d$An acid dye, available from Color Chem (Clariant).
$^e$A pigment, available from Brenntag Specialties.
$^f$A direct dye, available from Blackman Uhler.
$^g$A colorant, available from Chromatech Incorporated.

Colored Speckle Preparation (Method B)

1. 50 g of granulated soda ash (available from Brunner Mond) was sifted through #14 and #25 sieves. The speckles that would not go through the #25 were retained. These speckles were then put into the tumble mixer.

2. The desired amount of coloring agent was added to a small beaker and diluted with water, as indicated in Table 1. This colored aqueous solution was then sprayed with an airbrush onto the granulated soda ash.
3. The resulting colored speckles were then spread out on a piece of foil to dry overnight.
4. These colored speckles are provided as Comparative Examples 1 through 10 in Table 1B.

TABLE 1B

Colored speckles made according to Method B.

| Sample | Coloring Agent | % Wt. | Color Value | Amount of Coloring Agent (g) | Amount of Water (g) | Amount of soda ash (g) |
|---|---|---|---|---|---|---|
| Comparative Example 1 | Violet DD[a] (PP012) | 3 | 4.5 | 1.61 | 5 | 50 |
| Comparative Example 2 | Direct Violet 9[b] | 3.6 | 3.75 | 1.932 | 5 | 50 |
| Comparative Example 3 | Acid Blue 80[c] (01001) | 0.716 | 19.32 | 0.375 | 7 | 50 |
| Comparative Example 4 | Acid Red 52[d] | 0.163 | 85.31 | 0.085 | 6.3 | 50 |
| Comparative Example 5 | Ultamarine Blue[e] | 0.952 | NA | 0.5 | 6 | 50 |
| Comparative Example 6 | Blue SE[a] | 0.952 | 14.5 | 0.5 | 5 | 50 |
| Comparative Example 7 | Direct Blue 86[f] | 0.24 | 58.22 | 0.125 | 5 | 50 |
| Comparative Example 8 | Pigment Blue 15 | 0.952 | NA | 0.5 | 5 | 50 |
| Comparative Example 9 | Chromatint Yellow X-2407[g] | 0.952 | NA | 0.5 | 5 | 50 |
| Comparative Example 10 | PhotoBleach | 0.952 | NA | 0.5 | 5 | 50 |

[a]Liquitint ® polymeric colorant, available from Milliken & Company of Spartanburg, SC.
[b]A direct dye, available from Ciba.
[c]An acid dye, available from Aceto.
[d]An acid dye, available from Color Chem (Clariant).
[e]A pigment, available from Brenntag Specialties.
[f]A direct dye, available from Blackman Uhler.
[g]A colorant, available from Chromatech Incorporated.

B. Test Methods

Color Loading

The following test procedure was used to quantitatively determine the color loading of the colored speckles made according to Method A and Method B, as described herein:
1. Colored speckles made according to Method A were weighed into a volumetric flask which was then filled with 50 mL of de-ionized water.
2. The solution was shaken and allowed to sit for about 3 hours.
3. After this time expired, the flask was filled to 100 mL with MeOH.
4. A blank was prepared using 50 mL water diluted to 100 mL with MeOH.
5. These solutions were then read on a Beckman Coulter, DU 800 UV-Vis spectrophotometer. Absorbance readings of the solutions were carried out in a 1 cm path-length quartz cuvette.
6. This test method was repeated for the colored speckles made according to Method B.

It was noted that the de-ionized water dissolved the soda ash carrier, whereas the MeOH was used as a solvent for the coloring agent (MeOH was not added for water soluble coloring agents). A ratio of the Absorbance values adjusted for sample weight close to 1 indicated equal weight percent color loading on the speckles made via the two different methods (Method A and Method B). Test results are provided in Table 2.

Bleed Resistance Test

This test compares the bleed resistance of the colored speckles. Each sample tested for bleed resistance was prepared by adding 2 grams of the colored speckles to 50 grams of two different powder laundry detergents—Ariel and Everyday Elegance (commercially available from Procter & Gamble and Wal-Mart, respectively). Each of the mixtures was then placed in an unlined cardboard box in a controlled environment at 70% relative humidity and 37° C. for one week.

Each sample was then visually evaluated for the amount of color bleed that was observed to occur in the surrounding powder laundry detergent. A panel of 10 people evaluated the samples by comparing Example X with the corresponding Comparative Example X (e.g. Example 1 was compared with Comparative Example 1). One point was awarded against the sample that appeared to have more bleeding into the surrounding detergent. The sample having less bleeding received zero points. If the evaluator could not visually observe a difference in bleed between Example X and Comparative Example X, then both samples were awarded zero points. Thus, samples evaluated having lower scores exhibited better bleed resistance. Test results are provided in Table 3.

C. Test Results

Color Loading

The test results for the determination of color loading are provided in Table 2. The ratio of color loading was calculated for each sample as follows:

Ratio of Color Loading=Comparative Ex. Absorbance Value/Comparative Ex. Sample Weight Example Absorbance Value/Example Sample Weight

TABLE 2

Color Loading for Colored Speckles

| Sample | Coloring Agent | Sample Weight (g) | Absorbance (Optical Density/cm) | Color Value (lambda max in nm) | Ratio of Color Loading on speckles |
|---|---|---|---|---|---|
| Example 1 | Violet DD (PP012) | 0.3036 | 0.2592 | 569.5 | 1.235 |
| Comparative Example 1 | Violet DD (PP012) | 0.3320 | 0.3502 | 570.0 | |

TABLE 2-continued

Color Loading for Colored Speckles

| Sample | Coloring Agent | Sample Weight (g) | Absorbance (Optical Density)/cm) | Color Value (lambda max in nm) | Ratio of Color Loading on speckles |
|---|---|---|---|---|---|
| Example 2 | Direct Violet 9 | 0.4781 | 0.5455 | 562.5 | 0.987 |
| Comparative Example 2 | Direct Violet 9 | 0.5183 | 0.5840 | 562.0 | |
| Example 3 | Acid Blue 80 (01001) | 0.4356 | 0.5527 | 627.0 | 0.977 |
| Comparative Example 3 | Acid Blue 80 (01001) | 0.4336 | 0.5374 | 627.5 | |
| Example 6 | Blue SE | 0.3848 | 0.5115 | 635.5 | 0.975 |
| Comparative Example 6 | Blue SE | 0.3820 | 0.4949 | 635.5 | |
| Example 7 | Direct Blue 86 | 0.3636 | 0.4006 | 668.0 | 0.972 |
| Comparative Example 7 | Direct Blue 86 | 0.7145 | 0.7651 | 668.0 | |

As shown in Table 2, the ratio of the Absorbance values adjusted for sample weight are close to a value of 1, which indicates that the colored speckles contain approximately equal weight percent color loading regardless of the method used to make the speckles (Method A and Method B).

Bleed Resistance

The test results for the determination of bleed resistance are provided in Table 3.

TABLE 3

Bleed Resistance of Colored Speckles

| Sample | Coloring Agent | Everyday Elegance Laundry Detergent Bleed Resistance Evaluation Value | Ariel Laundry Detergent Bleed Resistance Evaluation Value |
|---|---|---|---|
| Example 1 | Violet DD (PP012) | 0 | 0 |
| Comparative Example 1 | Violet DD (PP012) | 7 | 10 |
| Example 2 | Direct Violet 9 | 0 | 0 |
| Comparative Example 2 | Direct Violet 9 | 7 | 10 |
| Example 3 | Acid Blue 80 (01001) | 1 | 0 |
| Comparative Example 3 | Acid Blue 80 (01001) | 2 | 9 |
| Example 5 | Ultramarine Blue | 0 | 0 |
| Comparative Example 5 | Ultramarine Blue | 1 | 2 |
| Example 6 | Blue SE | 1 | 0 |
| Comparative Example 6 | Blue SE | 1 | 10 |
| Example 7 | Direct Blue 86 | 1 | 0 |
| Comparative Example 7 | Direct Blue 86 | 2 | 3 |
| Example 8 | Pigment Blue 15 | 4 | 0 |
| Comparative Example 8 | Pigment Blue 15 | 1 | 2 |
| Example 9 | Chromatint Yellow - X 2407 | 1 | 3 |
| Comparative Example 9 | Chromatint Yellow - X 2407 | 5 | 4 |

The test results in Table 3 illustrate that most observers saw a noticeable improvement in bleed resistance for colored speckles made according to Method B, as opposed to Method A, for at least one of the detergents utilized in this test. In many instances, improvements in bleed resistance were observed for colored speckles made by Method B in both detergents.

Method B involved the use of pressure granulation (akin to roller compaction) to agglomerate colored powder. Method A involved spraying the coloring agent on the outside of pre-granulated speckles.

Thus, the above description and examples show that the inventive colored speckles, wherein the coloring agent is present throughout the cross-section of the colored speckle, exhibit improved bleed resistance in granular or powder detergent formulations with which they may be combined. As has been described herein, the inventive colored speckles possess a significant advantage over currently available colored speckles by exhibiting improved bleed resistance when added to granular detergent formulations, while also exhibiting the characteristics of being non-staining to textile materials and also providing good release of the coloring agent into wash water. As such, the present colored speckles represent a useful advance over the prior art.

These and other modifications and variations to the present invention may be practiced by those of ordinary skill in the art, without departing from the spirit and scope of the present invention. Furthermore, those of ordinary skill in the art will appreciate that the foregoing description is by way of example only, and is not intended to limit the scope of the invention described in the appended claims.

It is claimed:

1. A powdered detergent formulation comprising:
   (i) a surfactant in an amount sufficient to provide cleaning properties;
   (ii) at least about 1% by weight of a builder; and
   (iii) a colored speckle comprising:
      a) a majority by weight of at least one compacted sodium bicarbonate-containing carrier material; and
      b) at least one polymeric coloring agent;
   wherein the at least one compacted sodium bicarbonate-containing carrier material and the at least one polymeric coloring agent form a carrier-coloring agent composite, and wherein the carrier-coloring agent composite comprises a cross-sectional volume that is uniformly colored by the at least one polymeric coloring agent.

2. The powdered detergent formulation of claim 1, wherein the polymeric coloring agent is characterized by having a chromophore group selected from the group consisting of nitroso, nitro, azo, stilbene, bis-stilbene, biphenyl, oligophenethylene, fluorene, coumarin, naphthalamide, diarylmethane, triarylmethane, xanthene acridine, quinoline, methine, thiazole, indamine, indophenol, azine, thiazine, oxazine, aminoketone, hydroxyketone, anthraquinone, indigoid, phthalocyanine chromophore groups, and mixtures thereof.

* * * * *